United States Patent
Murakami et al.

(10) Patent No.: US 9,781,653 B2
(45) Date of Patent: Oct. 3, 2017

(54) WIRELESS DEVICE AND COMMUNICATION METHOD

(71) Applicant: FUJITSU LIMITED, Kawasaki-shi, Kanagawa (JP)

(72) Inventors: Yuya Murakami, Yokohama (JP); Yuki Shinada, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/204,665

(22) Filed: Jul. 7, 2016

(65) Prior Publication Data

US 2017/0026895 A1    Jan. 26, 2017

(30) Foreign Application Priority Data

Jul. 21, 2015  (JP) .................................. 2015-143646

(51) Int. Cl.
*H04W 4/00*   (2009.01)
*H04W 40/20*  (2009.01)
(Continued)

(52) U.S. Cl.
CPC ........... *H04W 40/20* (2013.01); *H04W 4/005* (2013.01); *H04W 36/32* (2013.01); *H04W 40/12* (2013.01); *H04W 36/023* (2013.01); *H04W 60/04* (2013.01)

(58) Field of Classification Search
CPC ..... H04W 40/20; H04W 4/005; H04W 36/32; H04W 40/12; H04W 60/04
(Continued)

(56) References Cited

U.S. PATENT DOCUMENTS

| 8,340,703 B2* | 12/2012 | Laroia | H04B 7/2678 |
| | | | 455/502 |
| 8,787,185 B2* | 7/2014 | Muraoka | H04W 52/0206 |
| | | | 370/252 |

(Continued)

FOREIGN PATENT DOCUMENTS

| JP | 2013-529402 A | 7/2013 |
| JP | 2013-247673 A | 12/2013 |

OTHER PUBLICATIONS

3rd Generation Partnership Project, "Technical Specification Group Radio Access Network; Evolved Universal Terrestrial Radio Access (E-UTRA); Requirements for support of radio resource management (Release 10)", 3GPP TS 36.133 V10.9.0, Dec. 2012.
(Continued)

*Primary Examiner* — Marceau Milord
(74) *Attorney, Agent, or Firm* — Arent Fox LLP

(57) ABSTRACT

A wireless device includes a memory, and a processor coupled to the memory and configured to store data into the memory, detect that the wireless device moves from a first cell area formed by a first base station to a second cell area formed by a second base station, when it is detected that the wireless device moves from a first cell area to a second cell area, determine whether to execute a processing for establish a communication path between the second base station and the wireless device based on an amount of the data stored in the memory, when it is determined to execute the processing for establish the communication path, execute the processing for establish the communication path, and send, to the second base station, the data stored in the memory using the established communication path.

18 Claims, 24 Drawing Sheets

(51) Int. Cl.
*H04W 40/12* (2009.01)
*H04W 36/32* (2009.01)
*H04W 60/04* (2009.01)
*H04W 36/02* (2009.01)

(58) Field of Classification Search
USPC ..... 455/435.1, 562.1, 436, 442, 67.11, 67.13
See application file for complete search history.

(56) References Cited

U.S. PATENT DOCUMENTS

| | | | | |
|---|---|---|---|---|
| 8,885,466 | B1* | 11/2014 | Seleznyov | H04W 4/001 |
| | | | | 370/229 |
| 9,204,355 | B2* | 12/2015 | Zhang | H04W 48/02 |
| 9,326,197 | B2* | 4/2016 | Hasegawa | H04W 48/20 |
| 9,497,566 | B2* | 11/2016 | Aghili | H04W 4/00 |
| 2009/0005031 | A1* | 1/2009 | Van Lieshout | H04W 36/32 |
| | | | | 455/425 |
| 2012/0072979 | A1* | 3/2012 | Cha | G06F 21/34 |
| | | | | 726/7 |
| 2012/0231828 | A1* | 9/2012 | Wang | H04W 74/04 |
| | | | | 455/509 |
| 2012/0264443 | A1* | 10/2012 | Ng | H04W 4/005 |
| | | | | 455/450 |
| 2013/0040640 | A1* | 2/2013 | Chen | H04W 36/30 |
| | | | | 455/434 |
| 2013/0100895 | A1 | 4/2013 | Aghili et al. | |
| 2013/0198838 | A1* | 8/2013 | Schmidt | H04L 9/3234 |
| | | | | 726/22 |
| 2014/0038622 | A1* | 2/2014 | Zhu | H04W 72/02 |
| | | | | 455/450 |
| 2014/0057631 | A1 | 2/2014 | Zhang et al. | |
| 2014/0376426 | A1* | 12/2014 | Boudreau | H04L 47/41 |
| | | | | 370/294 |
| 2016/0119739 | A1* | 4/2016 | Hampel | H04B 7/14 |
| | | | | 370/315 |
| 2016/0183071 | A1* | 6/2016 | Shinada | H04W 4/206 |
| | | | | 455/456.3 |

OTHER PUBLICATIONS

3rd Generation Partnership Project, "Technical Specification Group Radio Access Network; Requirements for support of radio resource management (FDD) (Release 11)", 3GPP TS 25.133 V11.3.0, Dec. 2012.

* cited by examiner

FIG. 10

| DATA TYPE | GROUP ID |
|---|---|
| AMOUNT OF FUEL DATA | GID#1 |
| MILEAGE DATA | GID#3 |
| IMPACT DATA | GID#1 |
| CONGESTION STATE DATA | GID#2 |
| HEALTH CONDITION DATA | GID#1 |
| ⋮ | ⋮ |

FIG. 11

| GROUP ID | THRESHOLD NUMBER OF DATA | THRESHOLD TIME |
|---|---|---|
| GID#1 | 1 | 10 |
| GID#2 | 3 | 100 |
| GID#3 | 5 | 300 |
| ⋮ | ⋮ | ⋮ |

FIG. 12

| GROUP ID | NUMBER OF DATA |
|---|---|
| GID#1 | 0 |
| GID#2 | 2 |
| GID#3 | 1 |
| ⋮ | ⋮ |

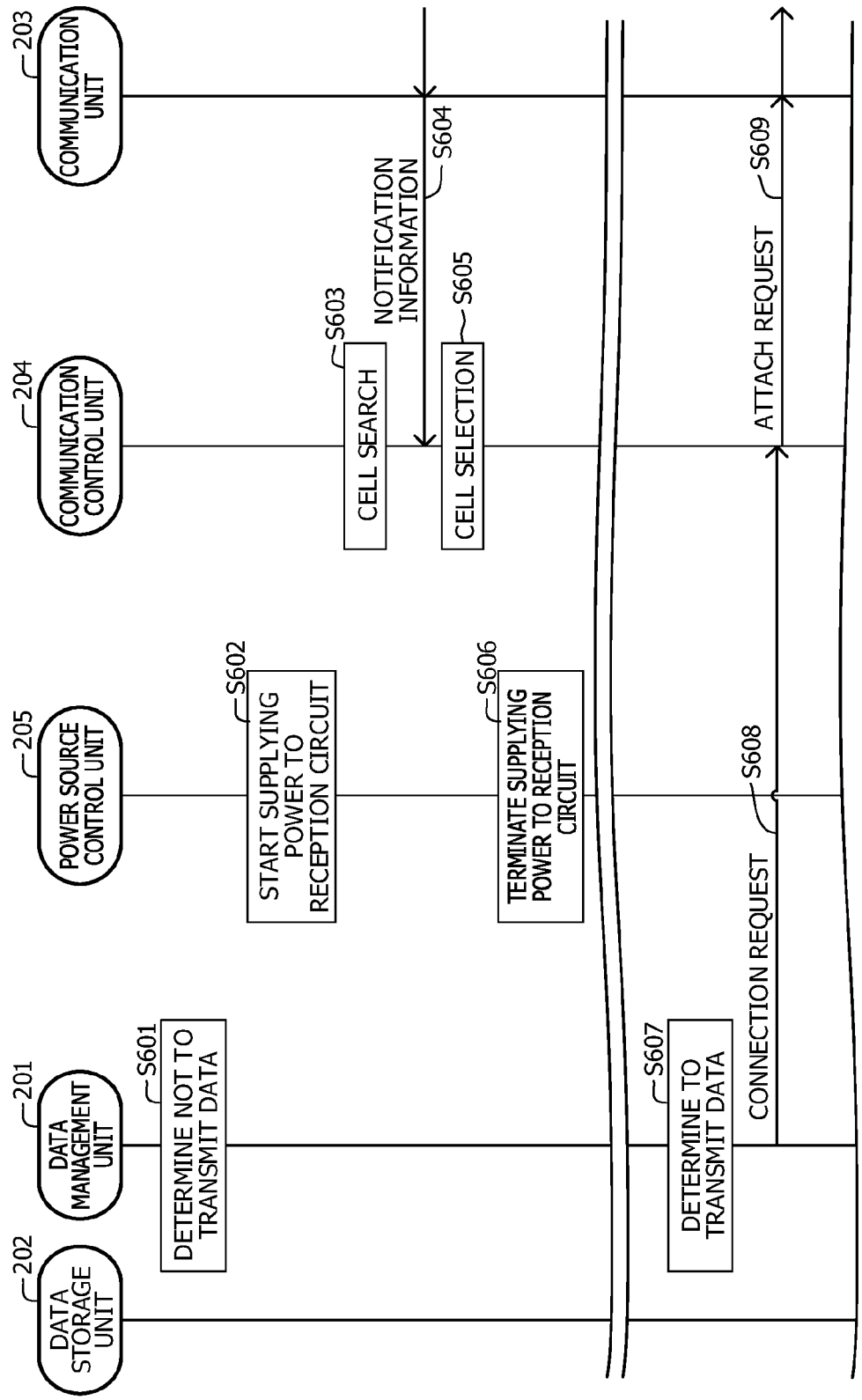

WIRELESS DEVICE AND COMMUNICATION METHOD

CROSS-REFERENCE TO RELATED APPLICATION

This application is based upon and claims the benefit of priority of the prior Japanese Patent Application No. 2015-143646, filed on Jul. 21, 2015, the entire contents of which are incorporated herein by reference.

FIELD

The embodiments discussed herein are related to a wireless device and a communication method.

BACKGROUND

Wireless communication systems including wireless devices are known. For example, a wireless device obtains data and transmits the obtained data to a computer, such as a server, or the like via a communication network. This communication is represented by a Machine-to-Machine (M2M) communication or a Machine Type Communication (MTC). Also, the wireless device is represented by an M2M Device (M2MD) or an MTC device.

As examples of related-art techniques, Japanese National Publication of International Patent Application No. 2013-529402, Japanese Laid-open Patent Publication No. 2013-247673, "Technical Specification Group Radio Access Network; Evolved Universal Terrestrial Radio Access (E-UTRA); Requirements for support of radio resource management (Release 10)", 3GPP TS 36.133 V10.9.0, December, 2012, and "Technical Specification Group Radio Access Network; Requirements for support of radio resource management (FDD) (Release 11)", 3GPP TS 25.133 V11.3.0, December, 2012 are known.

SUMMARY

According to an aspect of the invention, a wireless device includes a memory, and a processor coupled to the memory and configured to store data into the memory, detect that the wireless device moves from a first cell area formed by a first base station to a second cell area formed by a second base station, when it is detected that the wireless device moves from a first cell area to a second cell area, determine whether to execute a processing for establish a communication path between the second base station and the wireless device based on an amount of the data stored in the memory, when it is determined to execute the processing for establish the communication path, execute the processing for establish the communication path, and send, to the second base station, the data stored in the memory using the established communication path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a table illustrating an example of a data type and a group ID, which is stored in the M2MD in FIG. 6.

FIG. 11 is a table illustrating an example of a group ID, a threshold number of data, and a threshold time, which is stored in the M2MD in FIG. 6.

FIG. 12 is a table illustrating an example of a group ID and the number of data, which is stored in the M2MD in FIG. 6.

FIG. 24 is a sequence chart illustrating an example of operation of each function unit of the M2MD of a variation of the first embodiment.

DESCRIPTION OF EMBODIMENT(S)

A wireless device is mounted on a moving body, for example a vehicle or the like. The wireless device uses, as transmission data, for example, the amount of fuel of the vehicle, a vehicle speed, a rotational speed of the internal combustion engine mounted on a vehicle, a rotational speed of the wheels, and the like. In this case, the wireless device moves between wireless areas formed in a wireless communication system. When a wireless device moves between wireless areas during communication, in a wireless area of a moving destination of the wireless device, processing for establishing a new communication path is performed.

Incidentally, in order for a wireless communication system to distribute a communication load, a certain wireless area sometimes has a configuration in which a plurality of wireless areas that are smaller than the wireless area are formed within that wireless area. In this case, the frequency of a wireless device moving between wireless areas during communication is increased, and thus the frequency of movement between wireless areas is likely to become higher than the frequency of communication by the wireless device.

Accordingly, in the above-described wireless device, even if a new communication path is established in a wireless area of a moving destination, data transmission is sometimes not performed using the established communication path. In this manner, in the above-described wireless device, the resources (for example, computer resources and communication resources, or the like) of a wireless communication system are sometimes wasted with execution of the processing for establishing a communication path.

According to an embodiment, it is desirable to increase the use efficiency of the resources in a wireless communication system including a wireless device.

<Related Technology>

Figure 1:
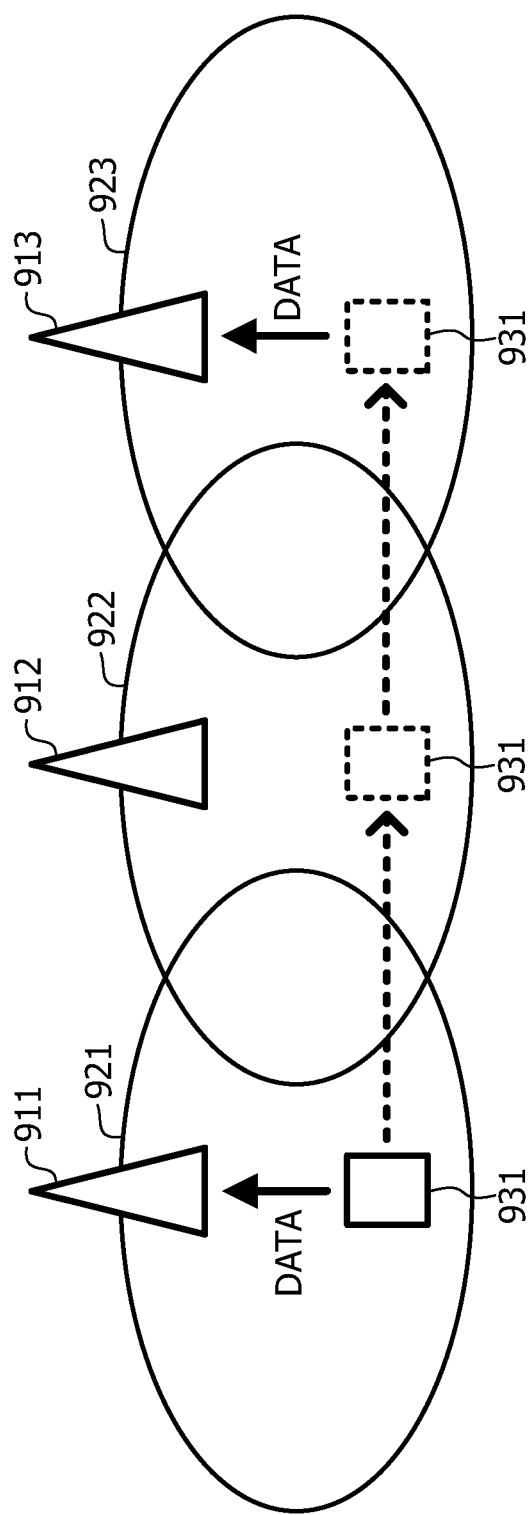
FIG. 1 illustrates an example in which an M2MD performs data transmission operation while moving between cells.

As illustrated in FIG. 1, it is assumed that an M2MD 931 moves from a cell 921 to a cell 922, and after that, moves from the cell 922 to a cell 923. The cells 921 to 923 are formed by eNB 911 to 913, respectively. eNB is an abbreviation for Evolved Node B.

Further, it is assumed that the M2MD 931 transmits data in respective periods in which the M2MD 931 is located in the cells 921 and 923, and does not transmit data in a period in which the M2MD 931 is located in the cell 922.

Figure 2:
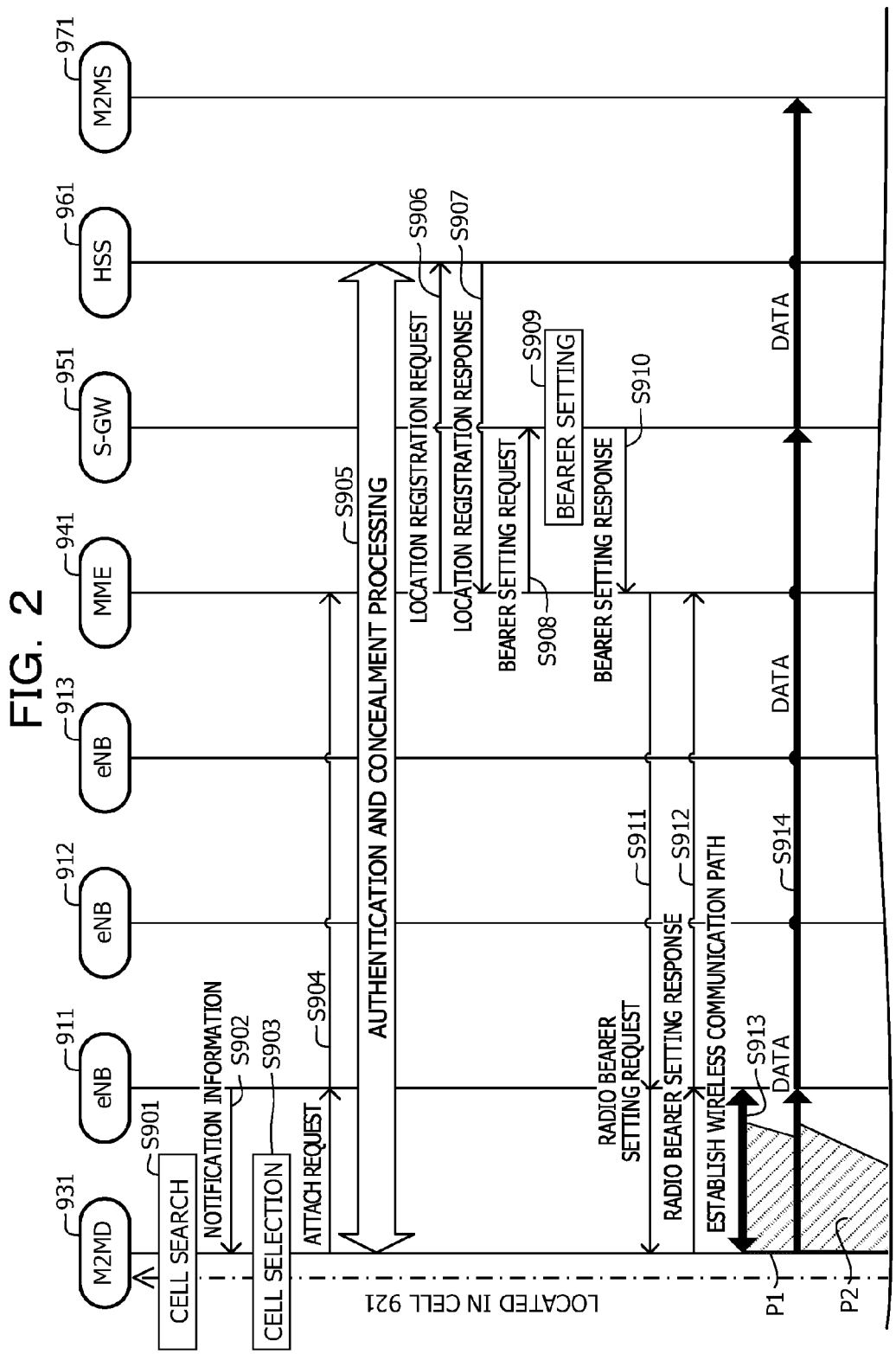
FIGS. 2, 3, 4, and 5 are sequence charts illustrating examples of operation of a wireless communication system.
Figure 3:
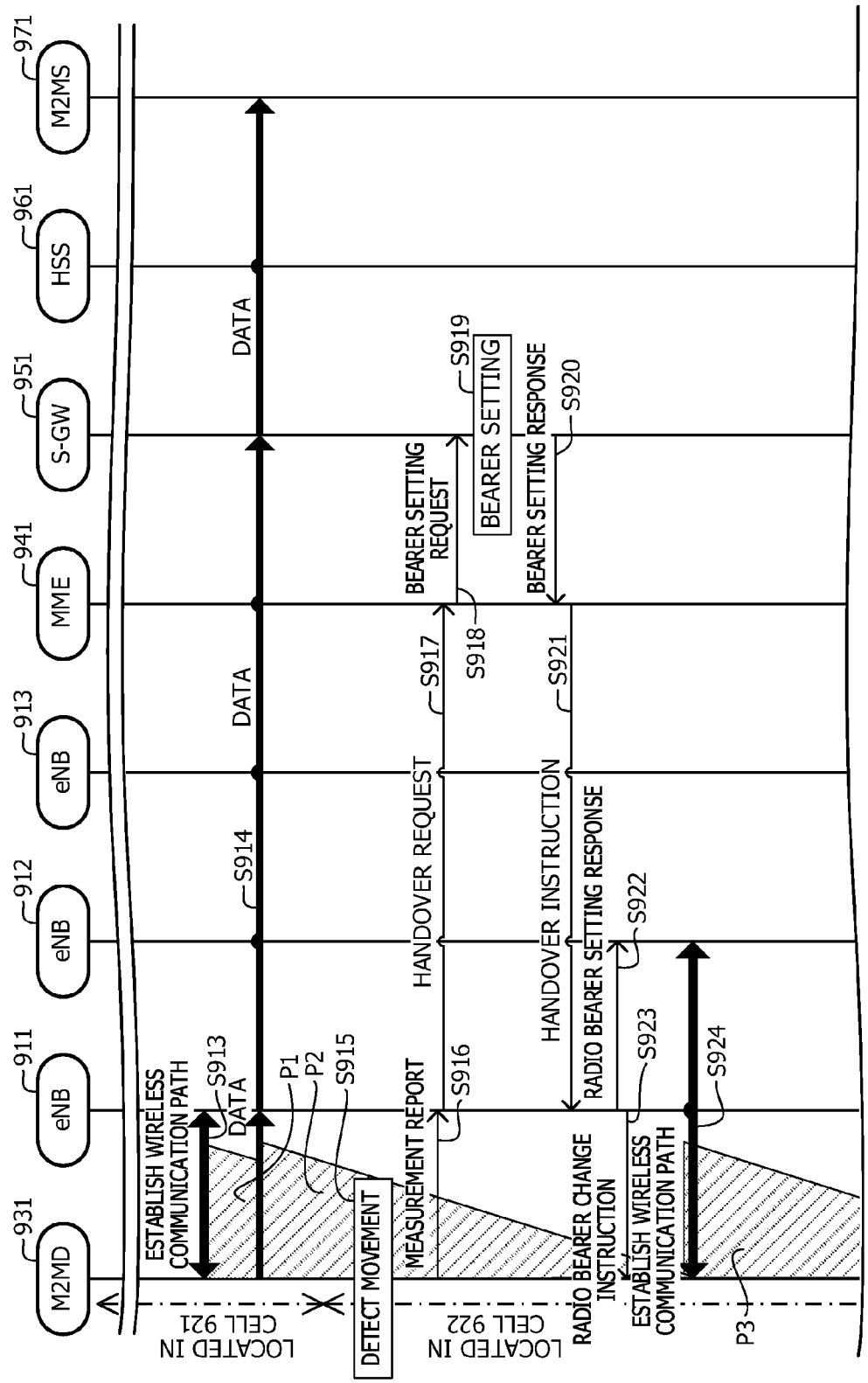
Figure 4:
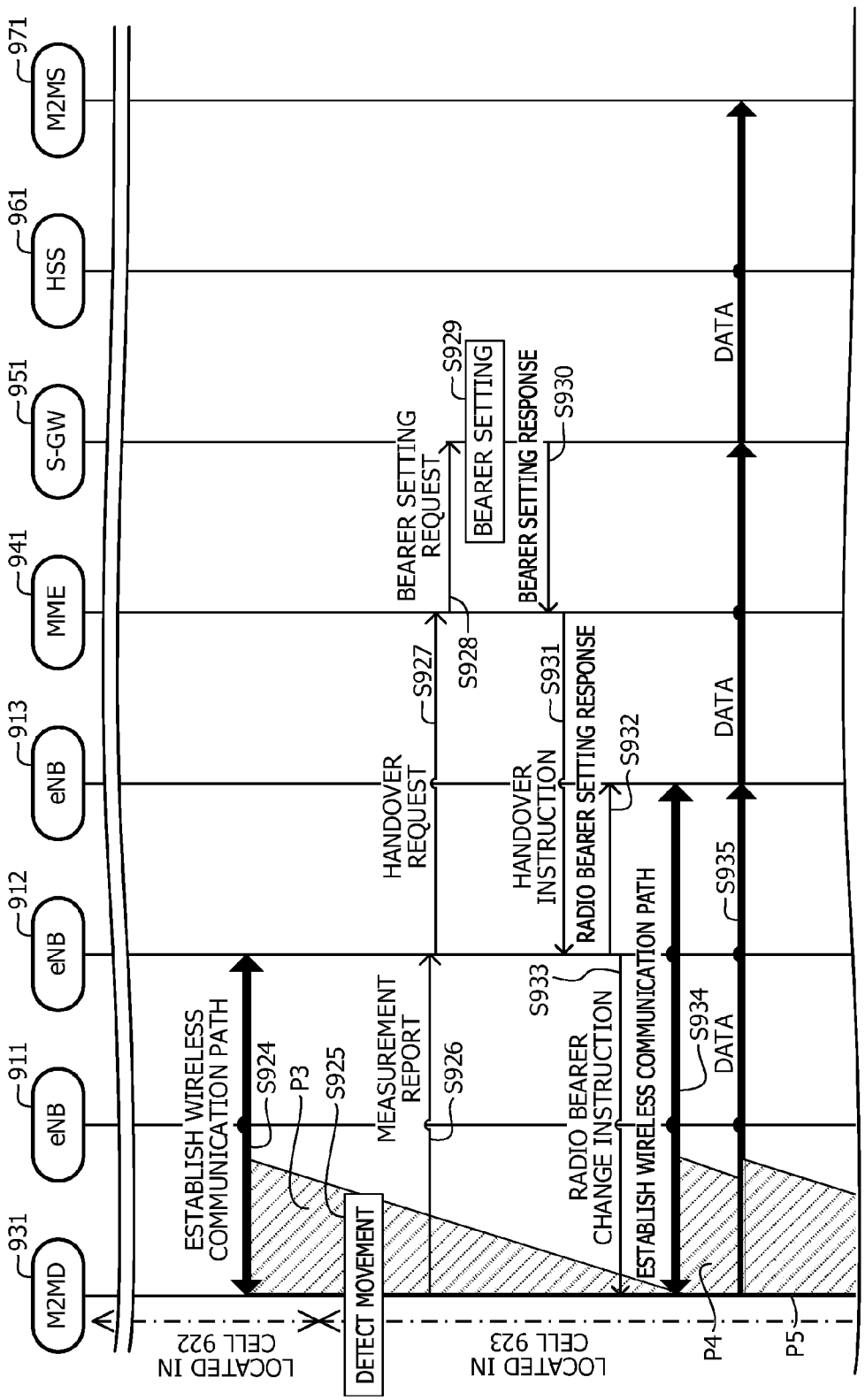

In this case, the wireless communication system operates as illustrated in FIGS. 2, 3, and 4. In this example, in the period in which the M2MD 931 is located in the cells 921, 922, and 923, the operation in steps S901 to S914 in FIG. 2, the operation in steps S915 to S924 in FIG. 3, and the operation in steps S925 to S935 in FIG. 4 are performed, respectively. FIGS. 2, 3, 4, and 5 are sequence charts illustrating examples of operation of the wireless communication system.

The wireless communication system includes the M2MD 931, the eNBs 911 to 913, an MME 941, an S-GW 951, an HSS 961, and an M2MS 971. MME is an abbreviation for Mobility Management Entity. S-GW is an abbreviation for Serving Gateway. HSS is an abbreviation for Home Subscriber Server. M2MS is an abbreviation for M2M Server.

In the following, a description will be given of operation in each step in FIGS. 2, 3, and 4 in order. In this regard, the details of operation in each step will be described in the same manner as the operation of the wireless communication system of the embodiment described later. Thus, here, a description will be given of an overview.

The M2MD 931 performs cell search (step S901 in FIG. 2). The M2MD 931 receives notification information from the eNB 911 based on a result of the cell search (step S902 in FIG. 2). The M2MD 931 selects a cell of a connection destination based on the received notification information (step S903 in FIG. 2).

The M2MD 931 transmits an attach request to the eNB 911 that forms the selected cell. The eNB 911 transmits the attach request from the M2MD 931 to the MME 941 (step S904 in FIG. 2). The M2MD 931 performs authentication and concealment processing with the HSS 961 (step S905 in FIG. 2).

The MME 941 transmits a location registration request to the HSS 961 (step S906 in FIG. 2). The HSS 961 registers the location of the M2MD 931 in response to the location registration request, and transmits a location registration response to the MME 941 (step S907 in FIG. 2).

The MME 941 transmits a bearer setting request to the S-GW 951 (step S908 in FIG. 2). The S-GW 951 sets a bearer in response to the bearer setting request (step S909 in FIG. 2), and transmits a bearer setting response to the MME 941 (step S910 in FIG. 2). The MME 941 transmits a radio bearer setting request to the eNB 911. The eNB 911 transmits the radio bearer setting request from the MME 941 to the M2MD 931 (step S911 in FIG. 2).

The M2MD 931 transmits a radio bearer setting response to the eNB 911 in response to the radio bearer setting request. The eNB 911 transmits the radio bearer setting response from the M2MD 931 to the MME 941 (step S912 in FIG. 2). Thereby, a wireless communication path is established between the M2MD 931 and the eNB 911 (step S913 in FIG. 2). The M2MD 931 transmits data to the M2MS 971 via a communication path including the established wireless communication path (step S914 in FIG. 2).

Incidentally, if data is not newly transmitted between the latest point in time, out of a point in time when a wireless communication path was established and a point in time when data was transmitted, to a point in time when a predetermined waiting time has passed, the wireless communication system releases the established wireless communication path.

In FIGS. 2 and 3, a hatched area P1 indicates a period from a point in time when a wireless communication path was established between the M2MD 931 and the eNB 911 to a point in time when a waiting time has passed. In the same manner, in FIGS. 2 and 3, a hatched area P2 indicates a period from a time in point when data was transmitted from the M2MD 931 to the eNB 911 to a point in time when a waiting time has passed.

In this example, in a period P2 between a point in time when data was transmitted from the M2MD 931 to the eNB 911 to a point in time when a waiting time has passed, the M2MD 931 moves from the cell 921 to the cell 922. Accordingly, the M2MD 931 detects movement between cells in the period P2 based on a measured reception power (step S915 in FIG. 3). The M2MD 931 transmits a measurement report to the eNB 911 in response to the detection of movement between cells (step S916 in FIG. 3). The eNB 911 transmits a handover request to the MME 941 based on the measurement report (step S917 in FIG. 3).

The MME 941 transmits a bearer setting request to the S-GW 951 in response to the handover request (step S918 in FIG. 3). The S-GW 951 sets a bearer in response to the bearer setting request (step S919 in FIG. 3), and transmits the bearer setting response to the MME 941 (step S920 in FIG. 3).

The MME 941 transmits a handover instruction to the eNB 911 in response to bearer setting response (step S921 in FIG. 3). The eNB 911 transmits a radio bearer setting request to the eNB 912 in response to the handover instruction (step S922 in FIG. 3) and transmits a radio bearer change instruction to the M2MD 931 (step S923 in FIG. 3). Thereby, a wireless communication path is established between the M2MD 931 and the eNB 912 (step S924 in FIG. 3).

In FIGS. 3 and 4, a hatched area P3 indicates a period from a point in time when the wireless communication path was established between the M2MD 931 and the eNB 912 to a point in time when a waiting time has passed. In this example, in the period P3 from a point in time when the wireless communication path was established between the M2MD 931 and the eNB 912 to a point in time when a waiting time has passed, the M2MD 931 moves from the cell 922 to the cell 923.

Accordingly, the M2MD 931 detects movement between cells in the period P3 based on the measured reception power (step S925 in FIG. 4). The M2MD 931 transmits a measurement report to the eNB 912 in response to the detection of movement between cells (S926 in FIG. 4).

The wireless communication system operates in the same manner as the steps S917 to S924 in FIG. 3 so as to establish a wireless communication path between the M2MD 931 and the eNB 913 (steps S927 to S934 in FIG. 4). The M2MD 931 transmits data via a communication path, including the established wireless communication path, to the M2MS 971 (step S935 in FIG. 4).

In FIG. 4, a hatched area P4 indicates a period from a point in time when a wireless communication path was established between the M2MD 931 and the eNB 913 to a point in time when a waiting time has passed. In the same manner, in a hatched area P5 in FIG. 4 indicates a period from a point in time when the M2MD 931 transmitted data to the eNB 913 to a point in time when the waiting time has passed.

In this manner, in the above-described example, in a period in which a wireless communication path is established between the M2MD 931 and the eNB 911 or 912, if the M2MD 931 moves between cells, movement control is performed, which was triggered by transmission of a measurement report by the M2MD 931. The movement control includes establishment of a communication path in the cell 922 or 923, which is the moving destination of the M2MD 931.

As described above, in this example, even if a communication path is newly established in the cell 922, which is the moving destination, the M2MD 931 does not transmit data using the established communication path. Accordingly, the M2MD 931 sometimes wastes the resources (for example, the computer resources, the communication resources, and the like) in the wireless communication system with the execution of processing for establishing a communication path in the cell 922. As the number of M2MDs in the wireless communication system increases, the resources that are wasted tend to increase.

Thus, as described later, the wireless device in the embodiment detects movement between wireless areas. If the above-described movement is detected, and the amount of data scheduled to be transmitted is smaller than a predetermined threshold amount of data, the wireless device suppresses execution of the processing for establishing a communication path in a wireless area of the moving destination.

Thereby, if the amount of data scheduled to be transmitted is smaller than a threshold amount of data, useless establishment of a communication path in a wireless area of the moving destination is suppressed. As a result, the use efficiency of the resources of the wireless communication system including the wireless device is increased.

Also, after the period P2 from a point in time from when the M2MD 931 transmitted data to the eNB 911 to a point in time when a waiting time has passed, the M2MD 931 sometimes moves from the cell 921 to the cell 922. In this case, the wireless communication system operates as illustrated in FIG. 5.

Figure 5:
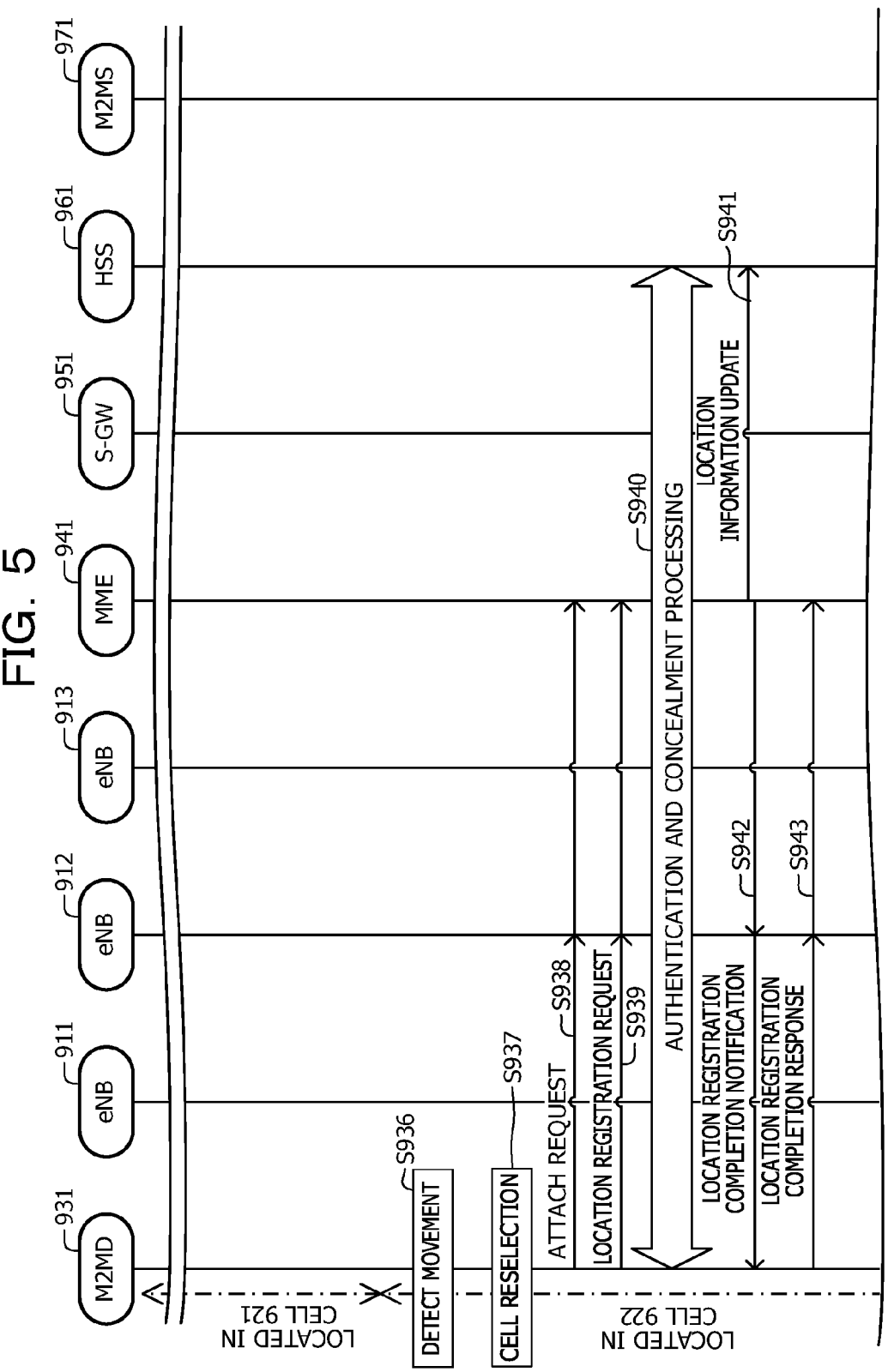

The M2MD 931 detects movement between cells after the period P2 based on the measured reception power (step S936 in FIG. 5). The M2MD 931 selects the cell 922 of the moving destination as a connection destination cell in response to the detection of movement between cells (step S937 in FIG. 5). The selection of a cell may be expressed as a reselection of a cell.

The M2MD 931 transmits an attach request to the eNB 912 that forms the selected cell. The eNB 912 transmits the attach request from the M2MD 931 to the MME 941 (step S938 in FIG. 5). Further, the M2MD 931 transmits a location registration request to the eNB 912 that forms the selected cell. The eNB 912 transmits the location registration request from the M2MD 931 to the MME 941 (step S939 in FIG. 5).

The M2MD 931 performs authentication and concealment processing with the HSS 961 (step S940 in FIG. 5). The MME 941 transmits a location information update to the HSS 961 (step S941 in FIG. 5). The HSS 961 updates the location of the M2MD 931 in response to the location information update.

The MME 941 transmits a location registration completion notification to the eNB 912. The eNB 912 transmits the location registration completion notification from the MME 941 to the M2MD 931 (step S942 in FIG. 5). The M2MD 931 transmits a location registration completion response to the eNB 912 in response to the location registration completion notification. The eNB 912 transmits the location registration completion response from the M2MD 931 to the MME 941 (step S943 in FIG. 5).

In this manner, in the example illustrated in FIG. 5, even if the M2MD 931 updates the location of the M2MD 931 in the cell 922 of the moving destination, which is registered in the HSS 961, the M2MD 931 does not transmit data in the cell 922 of the moving destination. Accordingly, the M2MD 931 sometimes wastes the resources (for example, the computer resources, the communication resources, and the like) in the wireless communication system with the execution of processing for updating the location of the M2MD 931, which is registered in the HSS 961. As the number of M2MDs in the wireless communication system increases, the resources that are wasted tend to increase.

Thus, as described later, if movement of the wireless device between the wireless areas is detected, and the amount of data scheduled to be transmitted is smaller than a predetermined threshold amount of data, the wireless device according to the embodiment suppresses the execution of processing for updating the location of the registered wireless device in the wireless area of the moving destination.

Thereby, if the amount of data scheduled to be transmitted is smaller than a threshold amount of data, in the wireless area of the moving destination, useless update of the location of the registered wireless device is suppressed. As a result, the use efficiency of the resources in the wireless communication system including the wireless device is increased. In this regard, in the wireless area of the moving destination, the processing for updating the registered wireless device may be considered to be included in the processing for establishing a communication path in the wireless area of the moving destination.

In the following, a description will be given of embodiments with reference to the drawings. However, the embodiments described in the following are examples. Accordingly, various variations and techniques that are not specifically described are not excluded from being applied to the embodiments. In this regard, in the drawings used in the following embodiments, a part to which the same symbol is given represents the same or a similar part unless a change or a variation is specifically described.

<First Embodiment>

(Configuration)

Figure 6:
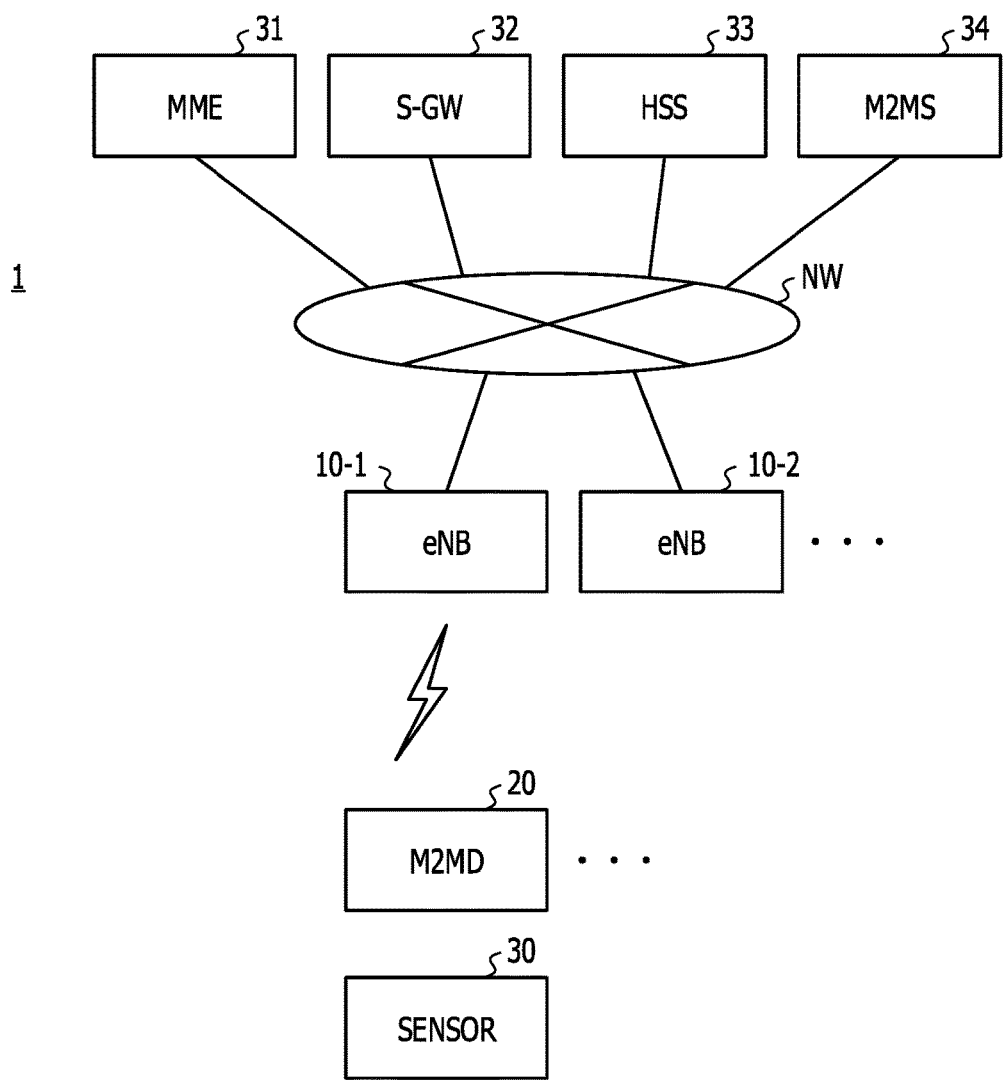
FIG. 6 illustrates an example of a configuration of a wireless communication system of a first embodiment.

FIG. 6 illustrates an example of a configuration of a wireless communication system according to a first embodiment. For example, as illustrated in FIG. 6, a wireless communication system 1 according to the first embodiment includes U pieces of eNBs 10-1, 10-2, . . . , 10-U, an M2MD 20, an MME 31, an S-GW 32, an HSS 33, and an M2MS 34. The M2MD 20 is an example of a wireless device. In this example, U denotes an integer of 2 or more. Also, in the following, if an eNB 10-u does not have to be distinguished, eNB 10-u may also be denoted by eNB 10. The letter u denotes each integer from 1 up to U.

In this regard, the wireless communication system 1 may include a plurality of M2MDs. Also, the wireless communication system 1 may include a wireless device (in other words, a non-M2MD) that is different from the M2MD. For example, a non-M2MD is held by a user, and performs communication with operation by the user. A non-M2MD is, for example, a mobile phone, a smartphone, or the like.

The wireless communication system 1 performs communication in accordance with a predetermined communication system. In this example, the communication system is an LTE system. LTE is an abbreviation for Long Term Evolution. In this regard, the communication system may be a system (for example, a system, such as an LTE-Advanced, or the like) different from the LTE system.

An eNB 10-u forms a cell. In this regard, the eNB 10-u may form a plurality of cells. A cell is an example of a wireless area. A wireless area may be denoted by a coverage area or a communication area. For example, a cell is a macro cell, a micro cell, a nano cell, a pico cell, a femto cell, a home cell, a small cell, a sector cell, or the like.

The eNB 10-u performs communication with the M2MD 20 located in a cell formed by the eNB 10-u by radio. In this example, the eNB 10-u provides radio resources in a cell formed by the eNB 10-u. In this example, the radio resources are identified by time and frequency. The eNB 10-u performs communication using the M2MD 20 located in the cell formed by the eNB 10-u and the radio resources provided in the cell.

In this example, the eNB 10-u transmits and receives a predetermined control signal with an M2MD 20 located in the cell formed by the eNB 10-u so as to establish a wireless communication path. The eNB 10-u transmits and receives a data signal with the M2MD 20 via the established wireless communication path. Establishment of a wireless communication path between the eNB 10-u that forms a cell and the M2MD 20 located in the cell may be represented as coupling the M2MD 20 to the cell.

If data is not newly transmitted and received in a period from the latest point in time out of a point in time when a wireless communication path is established and a point in time when data is transmitted and received via the established wireless communication path to a point in time when a predetermined waiting time has passed, the eNB 10-u releases the wireless communication path. Releasing a wireless communication path between the eNB 10-u that forms a cell and the M2MD 20 located in the cell may be represented as disconnection of the M2MD 20 from the cell.

The eNB 10-u determines whether or not to perform handover (HO) for the M2MD 20 based on a measurement report from the M2MD 20. HO represents changing a connection destination cell of the M2MD 20. In this example, the measurement report indicates a measurement report of the reception power in the coupled cell, and the reception power in the cell different from the coupled cell.

The eNB 10-u is an example of a base station. In this regard, the eNB 10-u may be denoted by a wireless apparatus or a wireless communication apparatus.

In this example, as illustrated in FIG. 6, the eNB 10-u is coupled to a communication network (for example, a core network) NW in a manner that allows wired communication. In this regard, the eNB 10-u may be coupled to the communication network NW in a manner that allows wireless communication in place of wired communication. The interface between the eNB 10-u and the communication network NW may be represented as an S1 interface. Also, the interface between eNBs 10 may be represented as an X2 interface.

An inner part of the communication network (that is to say, higher level) NW side than the eNB 10 among the wireless communication system 1 may be denoted by EPC. EPC is an abbreviation for Evolved Packet Core. A part formed by the eNB 10 among the wireless communication system 1 may be denoted by E-UTRAN. E-UTRAN is an abbreviation for Evolved Universal Terrestrial Radio Access Network.

An M2MD 20 performs communication with an eNB 10-u that forms the cell by radio using the radio resources provided in the cell in which the M2MD 20 is located. In this example, an M2MD 20 transmits and receives a predetermined control signal with an eNB 10-u that forms a cell in which the M2MD 20 is located so as to be coupled to the cell. Further, in this example, if the M2MD 20 is coupled to the cell, the M2MD 20 transmits and receives a data signal with the eNB 10-u.

In this regard, an M2MD 20 may be denoted by a wireless terminal, a wireless device, or a user terminal (UE; user equipment). Also, an M2MD 20 may be denoted by an IoT (Internet of Things) device.

In this example, the M2MD 20 is coupled to a sensor 30, and receives sensor data from the sensor 30. In this regard, an M2MD 20 may include a sensor 30. In this example, an M2MD 20 and a sensor 30 are mounted on a vehicle. In this regard, the M2MD 20 may be held by a user.

In this example, the sensor data represents the amount of fuel of a vehicle, a distance traveled by a vehicle, an impact strength (for example, an acceleration of a vehicle) against a vehicle, a congestion state of the road on which a vehicle is running, the health condition of a passenger on a vehicle, or the like. In this regard, the sensor data may represents a temperature, humidity, illuminance, a wind direction, a wind speed, earthquake motion, the amount of rainfall, the loudness of sound or a captured image or video.

The MME 31, the S-GW 32, the HSS 33, and the M2MS 34 are coupled to the communication network NW in a communication-enabled manner. The MME 31, the S-GW 32, and the HSS 33 may be configured by one or more server devices.

The MME 31 manages movement of the M2MD 20. For example, the MME 31 registers the location of the M2MD 20 in the HSS 33. Also, for example, the MME 31 controls incoming call paging. Also, for example, the MME 31 manages HO.

The S-GW 32 relays a data signal transmitted and received in the wireless communication system 1. In this example, the S-GW 32 relays a data signal between the M2MD 20 and the M2MS 34.

The HSS 33 manages information regarding a user of the wireless device including the M2MD 20. For example, the HSS 33 authenticates a user of the wireless device. Also, for example, the HSS 33 holds the location of the M2MD 20, which is registered in the MME 31. The M2MS 34 stores data included in the data signal received from the M2MD 20.

(Configuration; eNB 10)

Figure 7:
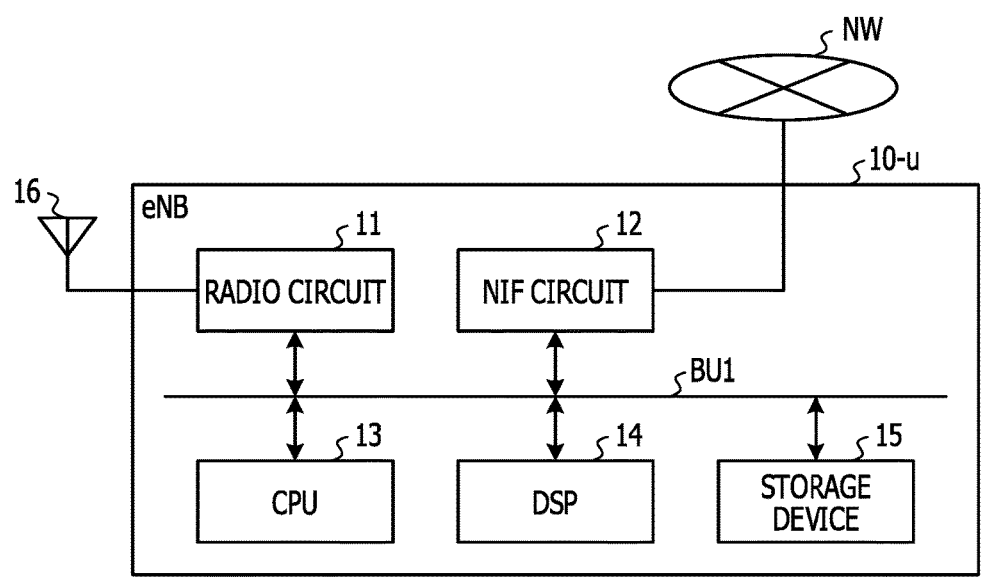
FIG. 7 illustrates an example of a configuration of the eNB in FIG. 6.

Next, a description will be given of a configuration of the eNB 10. FIG. 7 illustrates an example of a configuration of the eNB of FIG. 6. For example, as illustrated in FIG. 7, the eNB 10 includes a radio circuit 11, an NIF circuit 12, a CPU 13, a DSP 14, and a storage device 15, which are mutually coupled via a bus BU1. NIF is an abbreviation for Network Interface. CPU is an abbreviation for central processing unit. DSP is an abbreviation for digital signal processor.

The radio circuit 11 includes an antenna 16, and performs communication with the M2MD 20 located in the cell formed via the antenna 16. The functions of the radio circuit 11 may be achieved by a large scale integration (LSI).

In this example, the NIF circuit 12 includes a communication port capable of coupling to a communication cable, and performs communication with the other devices (for example, the MME 31, the S-GW 32, and the like) that are coupled to the communication network NW by being coupled to the communication network NW via the communication cable. The functions of the NIF circuit 12 may be achieved by an LSI.

The CPU 13 performs a program stored in the storage device 15 so as to control each unit of the eNB 10. In this regard, the eNB 10 may include an LSI, or a programmable logical circuit device (programmable logic device; PLD) in place of the CPU 13. The DSP 14 processes a digital signal. The functions of the DSP 14 may be achieved by an LSI.

For example, the storage device 15 includes at least one of a RAM, a ROM, an HDD, an SSD, a semiconductor memory, and an organic memory. RAM is an abbreviation for random access memory. ROM is an abbreviation for read only memory. HDD is an abbreviation for hard disk drive. SSD is an abbreviation for solid state drive. In this regard, the storage device 15 may include a recording medium, such as a flexible disk, an optical disc, a magneto-optical disc, a semiconductor memory, or the like, and an information-readable reading device capable of reading information from the recording medium.

(Configuration; M2MD 20)

Figure 8:
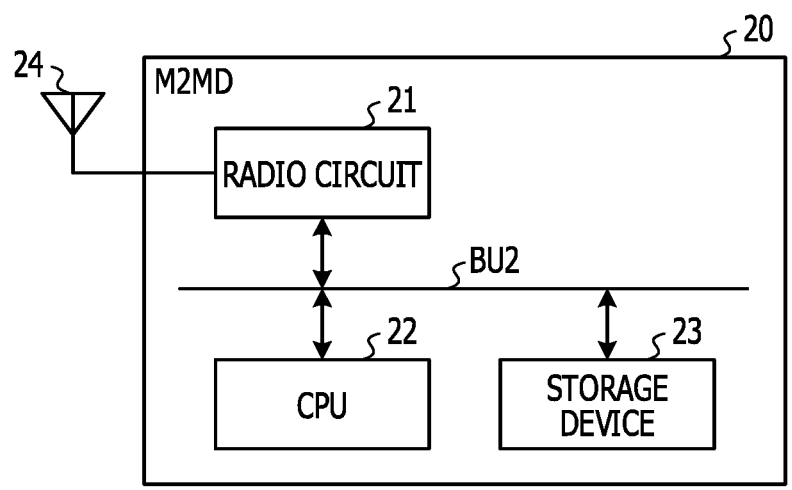
FIG. 8 illustrates an example of a configuration of the M2MD in FIG. 6.

FIG. 8 illustrates an example of a configuration of the M2MD in FIG. 6. For example, as illustrated in FIG. 8, the M2MD 20 includes a radio circuit 21, a CPU 22, and a storage device 23, which are mutually coupled via a bus BU2.

The radio circuit 21 includes an antenna 24 and performs communication with the eNB 10-u that forms a cell in which the M2MD 20 is located via the antenna 24. The CPU 22 executes a program stored in the storage device 23 so as to control each unit of the M2MD 20. The storage device 23 has the same function as that of the storage device 15. The radio circuit 21, the CPU 22, and the storage device 23 achieves the functions described later.

(Functions; M2MD 20)

Figure 9:
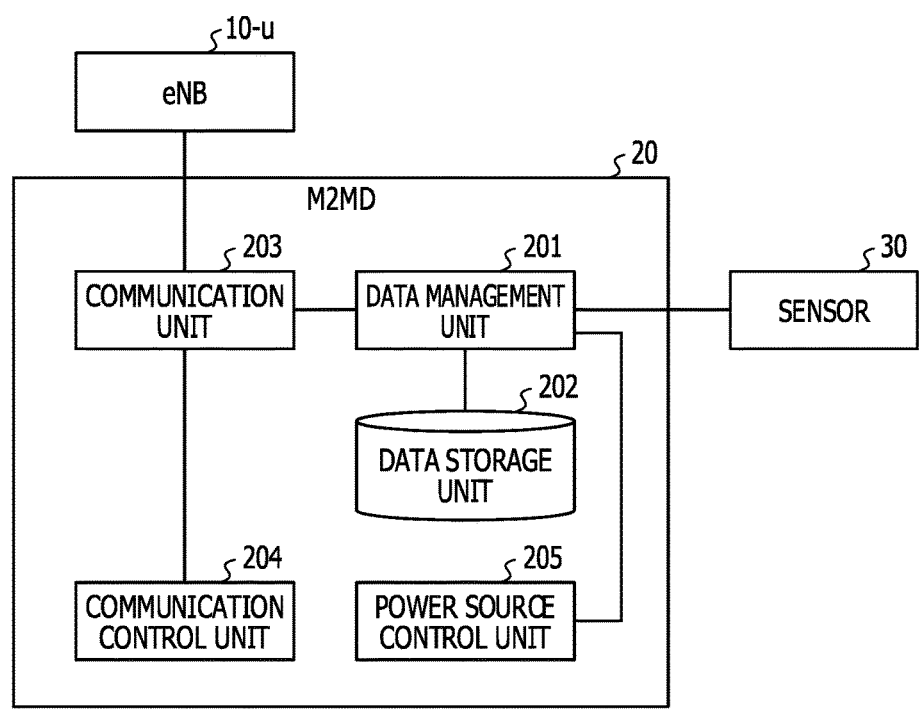
FIG. 9 illustrates an example of functions of the M2MD in FIG. 6.

Next, a description will be given of the functions of the M2MD 20. FIG. 9 illustrates an example of functions of the M2MD in FIG. 6. For example, as illustrated in FIG. 9, the functions of the M2MD 20 include a data management unit 201, a data storage unit 202, a communication unit 203, a communication control unit 204, and a power source control unit 205. In this example, the communication unit 203 is achieved by the radio circuit 21, the data storage unit 202 is achieved by the storage device 23, and the data management unit 201, the communication control unit 204, and the power source control unit 205 are achieved by the CPU 22.

The data management unit 201 receives sensor data from the sensor 30 and manages the received sensor data. The sensor data may be represented as data. The data reception is an example of obtaining data. In this example, the sensor data includes a plurality of types of sensor data.

In this example, the types of sensor data represents the amount of fuel data, mileage data, impact data, congestion state data, or health condition data. The amount of fuel data represents the amount of fuel of a vehicle. The mileage data represents the distance traveled by a vehicle. The impact data represents impact strength (for example, acceleration of a vehicle) against a vehicle. The congestion state data represents the congestion state (for example, a traffic volume, an average value of vehicle speed, or the like) of the road on which a vehicle is running. The health condition data represents the health condition (for example, a heart rate, a body temperature, a blood pressure, and the like) of the passenger of a vehicle.

FIG. 10 is a table illustrating an example of a data type and a group ID, which is stored in the M2MD in FIG. 6. In this example, as illustrated in FIG. 10, The data management unit 201 stores a data type and a group ID in association with each other. ID is an abbreviation for Identifier. The data type represents the type of sensor data. The group ID identifies a group that is classified based on the data type.

As illustrated in FIG. 10, in this example, the amount of fuel data, impact data, and health condition data are classified into a first group, which is identified by GID#1. Further, congestion state data is classified into a second group, which is identified by GID#2. In addition, mileage data is classified into a third group, which is identified by GID#3.

FIG. 11 is a table illustrating an example of a group ID, a threshold number of data, and a threshold time, which is stored in the M2MD in FIG. 6. Further, in this example, as illustrated in FIG. 11, the data management unit 201 stores a group ID, the threshold number of data, and threshold time in association with each other. The threshold number of data represents the upper limit value of the number of data waiting for transmission among data classified into a group associated with the threshold number of data. It may be understood that as the threshold number of data becomes smaller, the priority of a group associated with the threshold number of data becomes higher. In this regard, the threshold number of data may be set to a common value among the groups.

The threshold time represents an upper limit value of time during which transmission is waited among the data classified into a group associated with the threshold time. It may be understood that as the threshold time becomes smaller, the priority of the group associated with the threshold time becomes higher. In this regard, the threshold time may be set to a common value among the groups.

Figure 12:
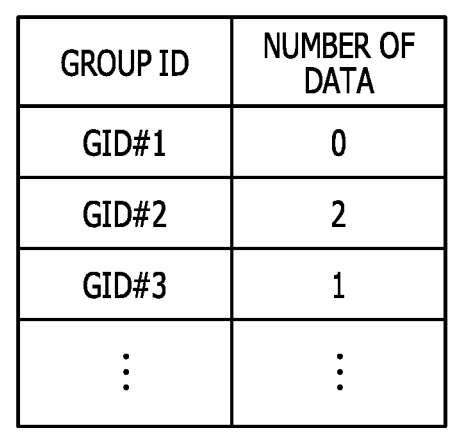

FIG. 12 is a table illustrating an example of a group ID and the number of data, which is stored in the M2MD in FIG. 6. In addition, in this example, as illustrated in FIG. 12, the data management unit 201 stores a group ID and the number of data in association with each other. The number of data represents the number of data waiting for transmission among the data classified into a group associated with the number of data. The information illustrated in FIG. 12 may be represented as a management table.

In this example, the data management unit 201 identifies a group to which the received sensor data is classified for each reception of sensor data based on the type of the received sensor data and the information illustrated in FIG. 10. The data management unit 201 adds 1 to the number of data, which is stored in association with the identified group so as to update the management table.

The data management unit 201 instructs the data storage unit 202 to store (in other words, contain) the received sensor data for each reception of sensor data. The data storage unit 202 stores the sensor data in accordance with the instruction from the data management unit 201. The sensor data stored in the data storage unit 202 is an example of data scheduled to be transmitted by the M2MD 20.

In this regard, if the data management unit 201 updates the management table, when the number of data changes from 0 to 1, the data management unit 201 starts a timer for the group associated with the number of data. In other words, the data management unit 201 starts measuring time by the timer such that the timer indicates a time period that has passed from a point in time when the number of data changed from 0 to 1. A time period indicated by the timer may be represented by a timer value.

The data management unit 201 determines whether or not to perform transmission of the sensor data based on the management table and the timer value. In this example, the data management unit 201 determines to transmit the sensor data if the number of data is equal to or larger than a threshold number of data for at least one group, and the timer value is higher than the threshold time. If there are no groups having the number of data that is equal to or larger than the threshold number of data, and there are no groups having the timer value equal to or higher the threshold time, the data management unit 201 determines not to perform transmission of the sensor data.

The number of data is an example of the amount of data scheduled to be transmitted by the M2MD 20. The threshold number of data is an example of the threshold amount of data. The timer value is an example of the time period in which data scheduled to be transmitted by the M2MD 20 is waiting for transmission.

If the data management unit 201 determines to perform transmission of the sensor data, the power source control unit 205 starts supplying power to the reception circuit. In this example, the reception circuit includes a part that receives a signal via the antenna 24 and a part that processes the received signal out of the radio circuit 21.

On the other hand, if the data management unit 201 determines not to perform transmission of the sensor data, the power source control unit 205 terminates the supply of power to the reception circuit. Thereby, the power source control unit 205 suppresses execution of cell connection processing and connection cell change processing, which will be described later, by the communication control unit 204. For example, the suppression may be represented by stop or disabling.

The communication unit 203 performs communication with the eNB 10 in accordance with the control by the communication control unit 204. The communication control unit 204 controls the communication by the communication unit 203. In this example, if power is supplied to the reception circuit, the communication control unit 204 measures the reception power for each lapse of a predetermined measurement period. If power is not supplied to the reception circuit, the communication control unit 204 does not measure reception power.

If power is supplied to the reception circuit, the communication control unit 204 performs cell connection processing and connection cell change processing. The communication control unit 204 performs the cell connection processing when the M2MD 20 is in an idle state. The idle state is a state in which the M2MD 20 is coupled to no cells. In other words, the idle state is a state in which a wireless communication path is not established between the M2MD 20 and any one of eNBs 10. In this example, the cell connection processing is processing for the M2MD 20 to select a cell, and to be coupled to the selected cell. The cell connection processing is an example of processing for establishing a communication path in a cell of the moving destination of the M2MD 20. Also, the cell connection processing may include processing for updating the registered location of the M2MD 20 in a cell of the moving destination of the M2MD 20.

If the M2MD 20 is in a coupled state, and movement of the M2MD 20 between cells is detected, the communication control unit 204 performs the connection cell change processing. The coupled state is a state in which the M2MD 20 is coupled to a cell. In other words, the coupled state is a state in which a wireless communication path is established between the M2MD 20 and the eNB 10-u.

In this example, the communication control unit 204 detects movement of the M2MD 20 between cells based on the measured reception power. For example, if reception power of a coupled cell is less than a value produced by subtracting a predetermined offset value from the reception power in a cell different from the coupled cell, the communication control unit 204 detects movement of the M2MD 20 between cells. If reception power of the coupled cell is equal to or higher than a value produced by subtracting the above-described offset value from the reception power in a cell different from the coupled cell, the communication control unit 204 does not detect movement of the M2MD 20 between cells.

In this example, the connection cell change processing is processing for the M2MD 20 to be coupled to a cell of the moving destination. The connection cell change processing is an example of processing for establishing a communication path in a cell of the moving destination of the M2MD 20. In this example, the connection cell change processing proceeds by the M2MD 20 transmitting a measurement report to the eNB 10-u that forms a coupled cell. In this example, the measurement report indicates a measurement result of the reception power of the coupled cell, and the reception power of a cell different from the coupled cell.

If the M2MD 20 is in a coupled state, the communication control unit 204 controls the communication unit 203 so as to transmit the sensor data stored in the data storage unit 202 to the M2MS 34.

If the sensor data is transmitted, the data management unit 201 instructs the data storage unit 202 so as to delete the transmitted sensor data. The data storage unit 202 deletes the stored sensor data in accordance with the instruction from the data management unit 201 (in other words, terminates storing sensor data).

Further, if the sensor data is transmitted, the data management unit 201 initializes the management table and the timer. In this example, the initialization of the management table is to set the number of data associated with each group to 0. In this example, the initialization of the management table may be expressed as the initialization of the number of data. Also, in this example, the initialization of the timer is to stop measuring time by the timer associated with each group, and to set time indicated by the timer to 0.

(Operation)

Figure 13:
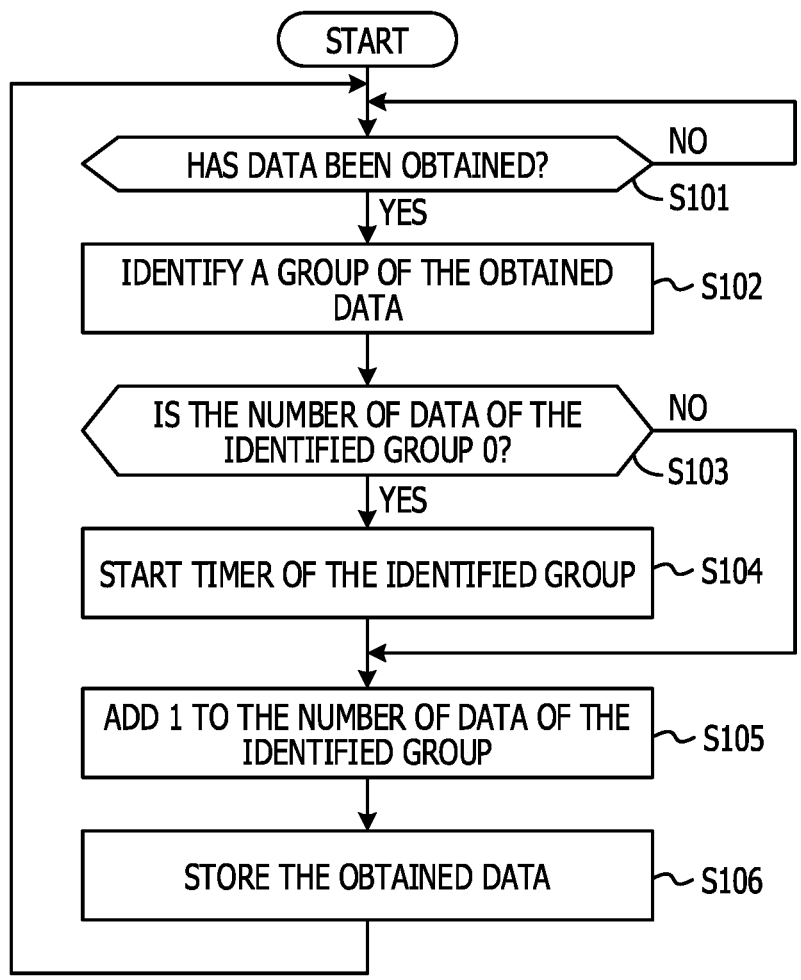
FIGS. 13, 14, and 15 are flowcharts illustrating examples of processing performed by the M2MD in FIG. 6.
Figure 14:
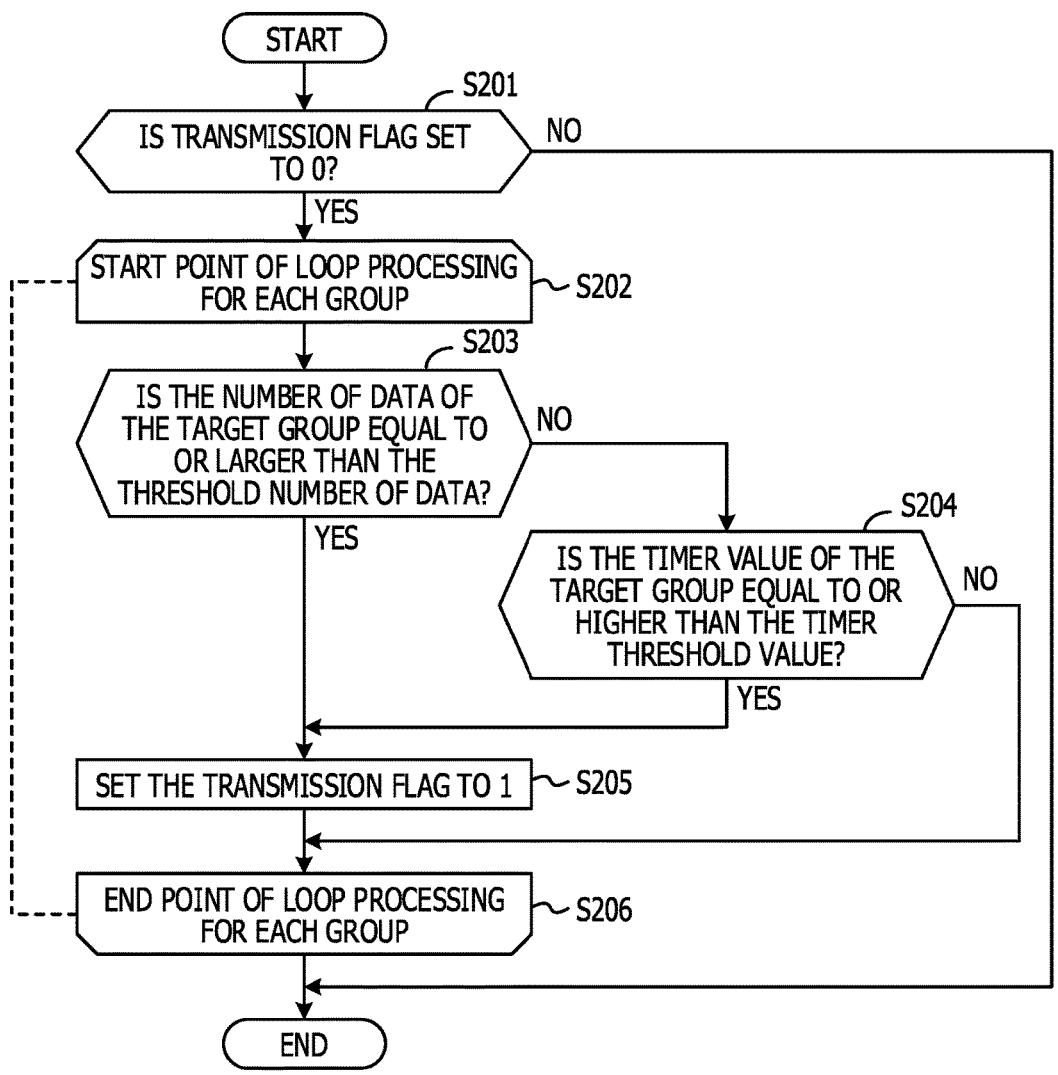
Figure 15:
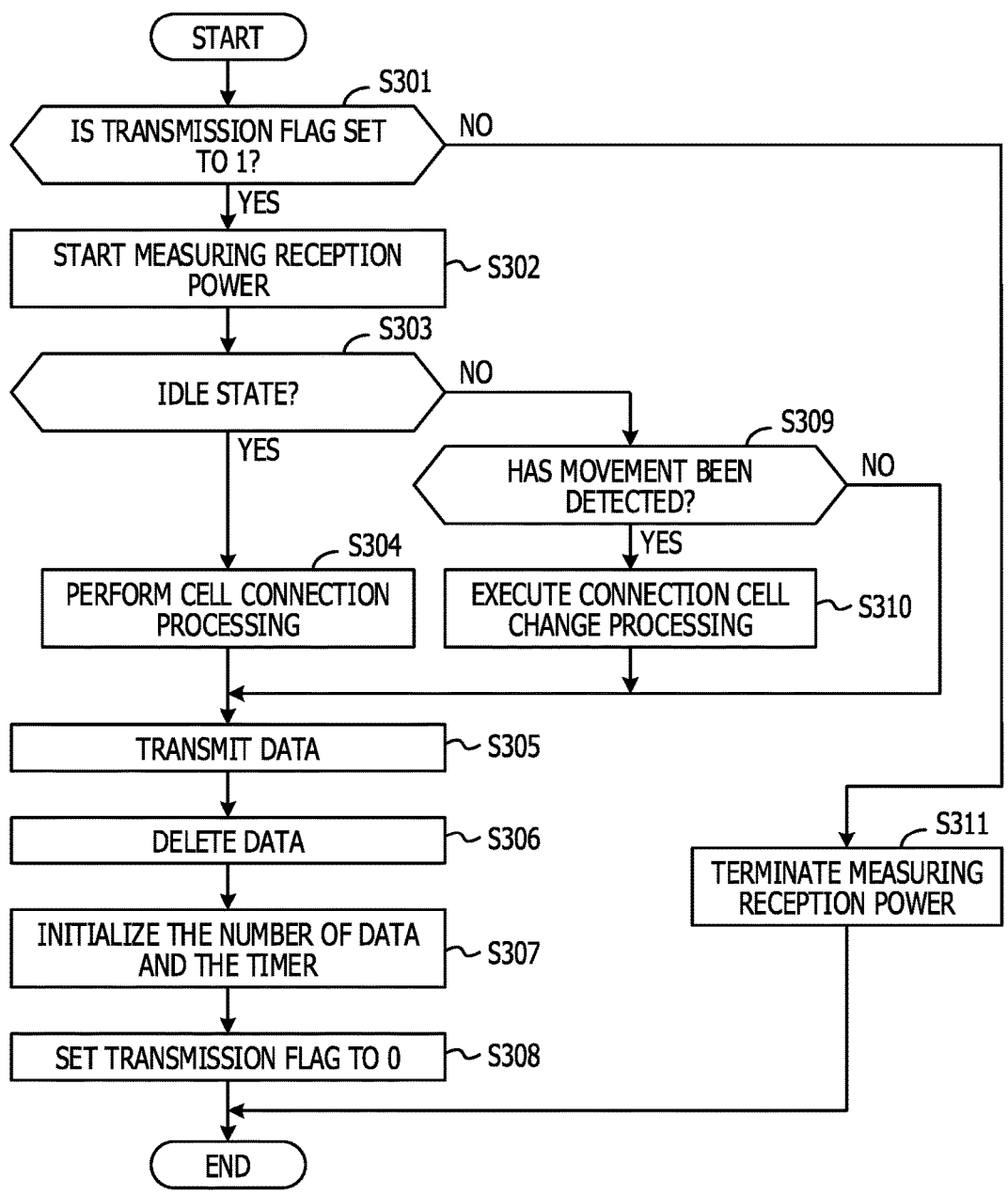

First, a description will be given of operation of the M2MD 20. FIGS. 13, 14, and 15 are flowcharts illustrating examples of processing executed by the M2MD in FIG. 6. In this example, the M2MD 20 performs processing illustrated by the flowcharts in FIGS. 13 to 15. The M2MD 20 starts the processing in FIG. 13 at the time of starting the M2MD 20, and waits until data is obtained ("No" route in step S101 in FIG. 13). If data has been obtained from the sensor 30, the M2MD 20 determines to be "Yes", and identifies a group of the obtained data (step S102 in FIG. 13).

Then the M2MD 20 determines whether or not the number of data of the identified group in the management table is 0 (step S103 in FIG. 13). If the number of data of the identified group is 0, the M2MD 20 determines to be "Yes", starts the timer of the identified group (step S104 in FIG. 13), and proceeds to step S105. On the other hand, if the number of data of the identified group is not 0, the M2MD 20 determines to be "No" in step S103, and the processing directly proceeds to step S105.

The M2MD 20 adds 1 to the number of data of the identified group (step S105 in FIG. 13), and stores the obtained data in the storage device 23 (step S106 in FIG. 13). Then the M2MD 20 returns to step S101, and executes the processing from step S101 to step S106 repeatedly.

Further, the M2MD 20 starts the processing in FIG. 14 each time a predetermined execution period has passed, and determines whether or not the transmission flag is set to 0 (step S201 in FIG. 14). The transmission flag indicates whether or not to execute transmission of data. In this example, when the transmission flag is set to 0, it indicates that transmission of data is not to be executed, whereas when the transmission flag is set to 1, it indicates that transmission of data is to be executed.

If the transmission flag is set to 1, the M2MD 20 determines to be "No", and the processing in FIG. 14 is terminated. On the other hand, if the transmission flag is set to 0, the M2MD 20 determines to be "Yes", and performs loop processing that uses each one of the plurality of groups included in the management table as a processing target in order. The start point of the loop processing for each group is step S202, and the end point of the loop processing of each group is step S206.

In the loop processing, the M2MD 20 determines whether or not the number of data of the group (in other words, target group) of the processing target is equal to or larger than a threshold number of data of the target group (step S203 in FIG. 14). If the number of data of the target group is equal to or larger than the threshold number of data of the target group, the M2MD 20 determines to be "Yes", sets 1 to the transmission flag (step S205 in FIG. 14), and terminates the loop processing of the target group.

On the other hand, if the number of data of the target group is smaller than the threshold number of data of the target group, the M2MD 20 determines to be "No" in step S203, and the processing proceeds to step S204. Then the M2MD 20 determines whether or not the timer value of the target group is equal to or higher than the threshold time of the target group (step S204 in FIG. 14).

If the timer value of the target group is equal to or greater than the threshold time of the target group, the M2MD 20 determines to be "Yes", sets the transmission flag to 1 (step S205 in FIG. 14), and the loop processing for the target group is terminated. On the other hand, if the timer value of the target group is less than the threshold time, the M2MD 20 determines to be "No" in step S204, does not set the transmission flag to 1, and the loop processing for the target group is terminated.

Then after the M2MD 20 performs loop processing for each of the plurality of groups included in the management table, the M2MD 20 terminates the processing in FIG. 14.

In addition, each time the M2MD 20 terminates the processing in FIG. 14, the M2MD 20 starts the processing in FIG. 15, and determines whether or not the transmission flag is set to 1 (step S301 in FIG. 15). If the transmission flag is set to 0, the M2MD 20 determines to be "No", and terminates measuring reception power (step S311 in FIG. 15).

In this example, the M2MD 20 terminates supplying power to the reception circuit so as to terminate measuring the reception power. In this regard, the M2MD 20 may terminate measuring the reception power while supplying power to the reception circuit. Then the M2MD 20 terminates the processing in FIG. 15.

On the other hand, if the transmission flag is set to 1, the M2MD 20 determines to be "Yes" in step S301, and starts measuring the reception power (step S302 in FIG. 15). In this example, the M2MD 20 starts supplying power to the reception circuit so as to start measuring the reception power.

Next, the M2MD 20 determines whether or not the M2MD 20 is in an idle state (step S303 in FIG. 15). If the M2MD 20 is in an idle state, the M2MD 20 determines to be "Yes", executes the cell connection processing (step S304 in FIG. 15), and the processing proceeds to step S305.

On the other hand, if the M2MD 20 is in a coupled state, the M2MD 20 determines to be "No", and determines whether or not movement of the M2MD 20 between cells has been detected (step S309 in FIG. 15). In this example, as described above, the M2MD 20 determines whether or not movement of the M2MD 20 between cells has been detected based on the measured reception power.

If movement of the M2MD 20 between cells has been detected, the M2MD 20 determines to be "Yes", executes the connection cell change processing (step S310 in FIG. 15), and the processing proceeds to step S305. On the other hand, movement of the M2MD 20 between cells has not been detected, the M2MD 20 determines to be "No" in step S309, the connection cell change processing is not executed, and the processing proceeds to step S305.

Next, the M2MD 20 transmits the sensor data stored in the storage device 23 to the M2MS 34 via the eNB 10-u that forms the coupled cell (step S305 in FIG. 15). Then the M2MD 20 deletes the transmitted sensor data from the storage device 23 (step S306 in FIG. 15).

Next, the M2MD 20 initializes the number of data and the timer (step S307 in FIG. 15). Then the M2MD 20 sets the transmission flag to 0 (step S308 in FIG. 15), and terminates the processing in FIG. 15.

Figure 16:
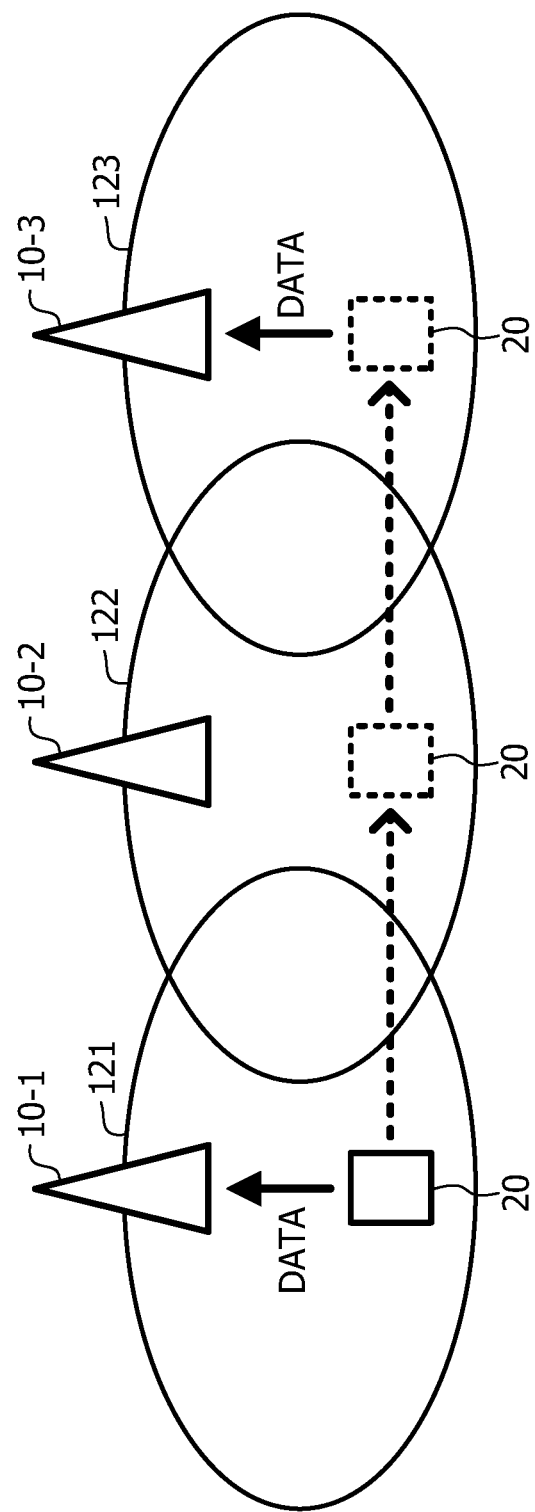
FIG. 16 illustrates an example in which the M2MD in FIG. 6 performs data transmission operation while moving between cells.

Next, a description will be given of an example of operation of the wireless communication system 1. FIG. 16 illustrates an example in which the M2MD in FIG. 6 performs data transmission operation while moving between cells. As illustrated in FIG. 16, it is assumed that the M2MD 20 moves from the cell 121 to the cell 122, and then moves from the cell 122 to the cell 123. The cells 121 to 123 are formed by the eNBs 10-1 to 10-3, respectively.

Further, it is assumed that in periods in which the M2MD 20 is located in the cell 121 and the 123, respectively, the number of data of at least one group is equal to or larger than a threshold number of data. Further, it is assumed that in a period in which the M2MD 20 is located in the cell 122, there are no groups having the number of data that is equal to or larger than the threshold number of data, and there are no groups having a timer value higher than a threshold time.

Figure 17:
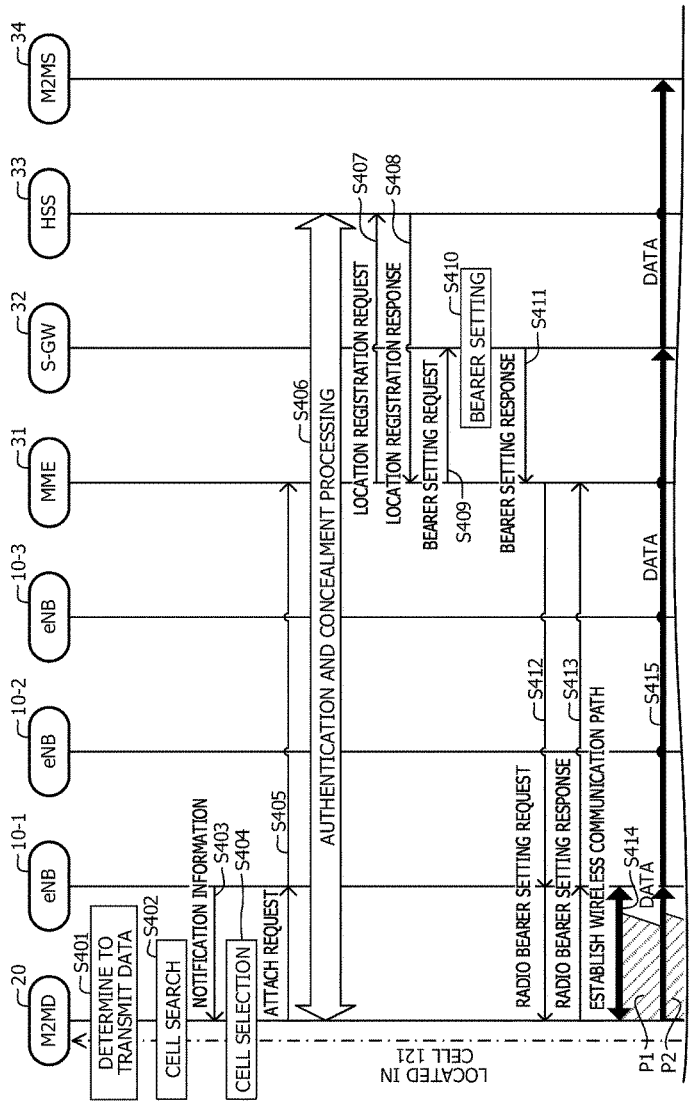
FIGS. 17, 18, 19, 20, 21, and 22 are sequence charts illustrating examples of operation of the wireless communication system in FIG. 6.
Figure 18:
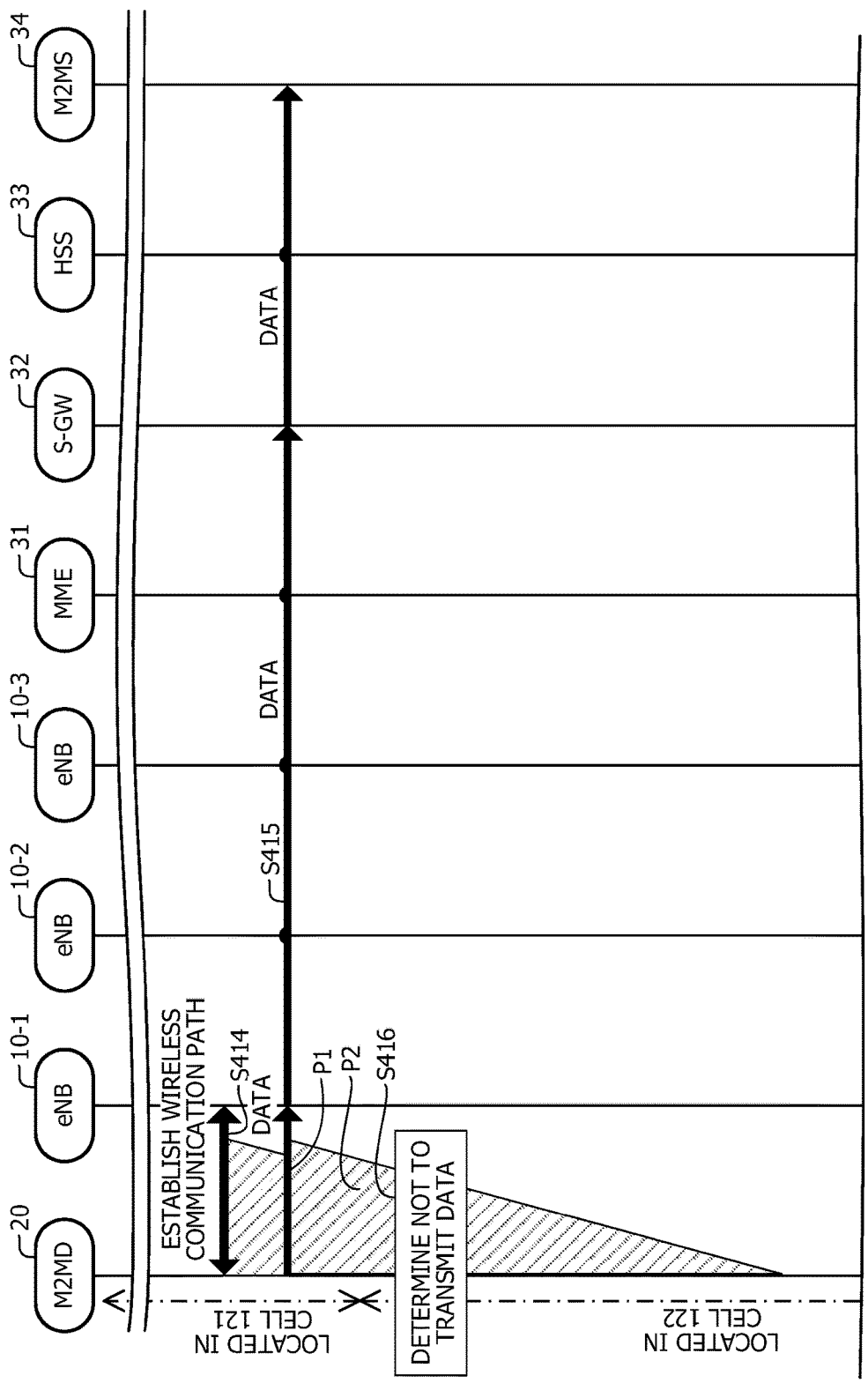
Figure 19:
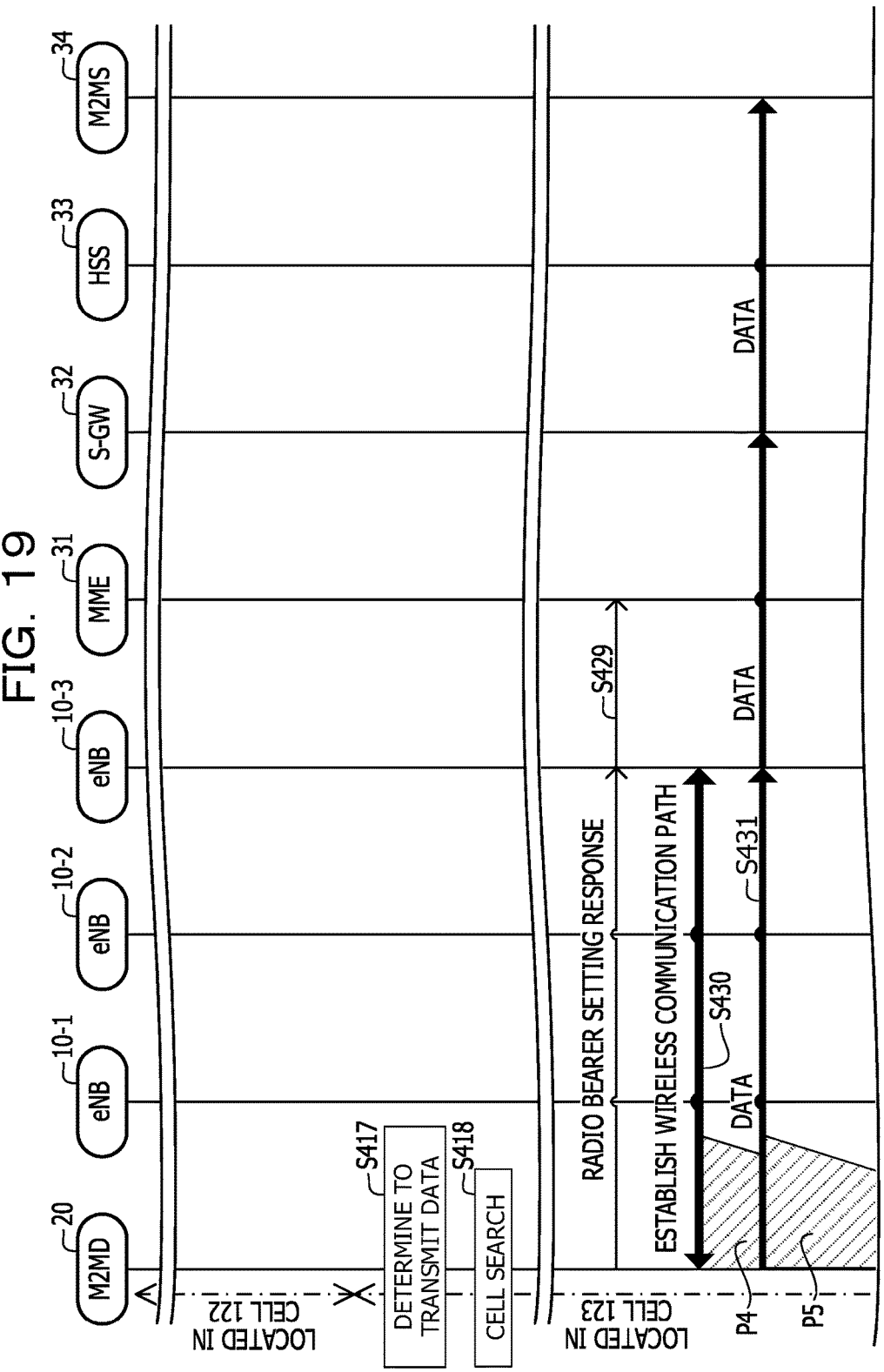

In this case, the wireless communication system 1 performs operation as illustrated in FIG. 17 to FIG. 19. In this example, in the period in which the M2MD 20 is located in the cells 121, 122, and 123, the operation of steps S401 to S415 in FIG. 17, the operation of step S416 in FIG. 18, and the operation of steps S417 to S431 in FIG. 19 are performed, respectively. FIGS. 17, 18, 19, 20, 21, and 22 are sequence charts illustrating examples of operation of the wireless communication system in FIG. 6.

In this example, as described above, in a period in which the M2MD 20 is located in the cell 121, the number of data of at least one group becomes equal to or larger than the threshold number of data. Accordingly, at this point in time, the M2MD 20 determines to transmit data (step S401 in FIG. 17). Then the M2MD 20 starts supplying power to the reception circuit.

Thereby, the M2MD 20 performs cell search (step S402 in FIG. 17). The cell search is processing for searching a cell to be a candidate of the connection destination based on the correlation between a predetermined replica signal and the reception signal.

The M2MD 20 receives notification information from the eNB 10-1 based on a result of the cell search (step S403 in FIG. 17). The notification information includes information for identifying the radio resources provided in the cell. The M2MD 20 selects a connection destination cell based on the received notification information and the reception power in each cell (step S404 in FIG. 17).

The M2MD 20 transmits an attach request to the eNB 10-1 that forms the selected cell. An attach request is a signal that requests connection to a cell. The eNB 10-1 transmits the attach request from the M2MD 20 to the MME 31 (step S405 in FIG. 17). The M2MD 20 performs authentication and concealment processing with the HSS 33 (step S406 in FIG. 17). The authentication and concealment processing includes processing for authenticating that the M2MD 20 is a pre-registered wireless device and processing for concealing the M2MD 20 from the other devices.

The MME 31 transmits a location registration request to the HSS 33 (step S407 in FIG. 17). A location registration request is a signal that requests registration of the location of the M2MD 20 in the HSS 33. The location registration request includes information of the location of the M2MD 20. The HSS 33 registers the location of the M2MD 20 in response to the location registration, and transmits a location registration response to the MME 31 (step S408 in FIG. 17). A location registration response is a signal that indicates that the registration of the location has been completed.

The MME 31 transmits a bearer setting request to the S-GW 32 (step S409 in FIG. 17). A bearer setting request is a signal that requests the setting of a bearer. A bearer may be represented by a communication path. In this example, the bearer is a communication path between the S-GW 32 and the eNB 10-u.

The S-GW 32 sets a bearer in accordance with a bearer setting request (step S410 in FIG. 17), and transmits a bearer setting response to the MME 31 (step S411 in FIG. 17). The bearer setting response is a signal that indicates permission to set a bearer.

The MME 31 transmits a radio bearer setting request to the eNB 10-1. The radio bearer setting request is a signal that requests the setting of a radio bearer. A radio bearer may be expressed by a wireless communication path. In this example, the radio bearer is a wireless communication path between the eNB 10-u and the M2MD 20. The eNB 10-1 transmits the radio bearer setting request from the MME 31 to the M2MD 20 (step S412 in FIG. 17).

The M2MD 20 transmits a radio bearer setting response to the eNB 10-1 to a radio bearer setting request. The radio bearer setting response is a signal that permits to set a radio bearer. The eNB 10-1 transmits the radio bearer setting response from the M2MD 20 to the MME 31 (step S413 in FIG. 17). Thereby, a wireless communication path is established between the M2MD 20 and the eNB 10-1 (step S414 in FIG. 17). The M2MD 20 transmits data to the M2MS 34 via a communication path including the established wireless communication path (step S415 in FIG. 17).

If data is not newly transmitted in a period from the latest point in time out of a point in time when a wireless communication path is established and a point in time when data is transmitted to a point in time when a predetermined waiting time has passed, the wireless communication system 1 releases the established wireless communication path.

Hatched areas P1 in FIGS. 17 and 18 indicate periods from a point in time when a wireless communication path is established between the M2MD 20 and the eNB 10-1 to a point in time when a waiting time has passed, respectively. In the same manner, hatched areas P2 in FIGS. 17 and 18 indicate periods from a point in time when the M2MD 20 transmitted data to the eNB 10-1 to a point in time when a waiting time has passed.

In this example, in the period P2 from a point in time when the M2MD 20 transmitted data to the eNB 10-1 to a point in time when a waiting time has passed, the M2MD 20 moves from the cell 121 to the cell 122. In this example, as described above, at this point in time, there are no groups having the number of data equal to or larger than the threshold number of data, and there are no groups having the timer value data equal to or greater than the threshold time. Accordingly, in the period P2, the M2MD 20 determines not to transmit data (step S416 in FIG. 18).

Accordingly, the M2MD 20 terminates supplying power to the reception circuit so as to terminate measuring the reception power. Thereby, the M2MD 20 does not transmit a measurement report to the eNB 10-1. As a result, the processing for establishing a wireless communication path between the M2MD 20 and the eNB 10-2 is not executed.

Further, when the waiting time passes from a point in time when the M2MD 20 transmitted data to the eNB 10-1, the established wireless communication path between the M2MD 20 and the eNB 10-1 is released. Thereby, the M2MD 20 goes into an idle state.

Then the M2MD 20 moves from the cell 122 to the cell 123. In this example, as described above, at this point in time, the number of data of at least one group becomes equal to or larger than the threshold number of data. Accordingly, the M2MD 20 determines to transmit data (step S417 in FIG. 19).

The wireless communication system 1 performs operation in the same manner as the steps S402 to S414 in FIG. 17 so as to establish a wireless communication path between the M2MD 20 and the eNB 10-3 (steps S418 to S430 in FIG. 19). In this regard, in FIG. 19, steps S419 to S428 are omitted to be illustrated. The M2MD 20 transmits data to the M2MS 34 via a communication path including the established wireless communication path (step S431 in FIG. 19).

A hatched area P4 in FIG. 19 indicates a period from a point in time when a wireless communication path was established between the M2MD 20 and the eNB 10-3 to a point in time when a waiting time has passed. In the same manner, a hatched area P5 in FIG. 19 indicates a period from a point in time when the M2MD 20 transmitted data to the eNB 10-3 to a point in time when a waiting time has passed.

In this manner, in this example, if the M2MD 20 moves from the cell 121 to the cell 122 in a period in which a wireless communication path is established between the M2MD 20 and the eNB 10-1, transmission of a measurement report by the M2MD 20 is suppressed. Thereby, the execution of the processing for establishing a communication path in the cell 122 of the moving destination is suppressed.

Thereby, if the amount of data scheduled to be transmitted is smaller than a threshold amount of data, useless establishment of a communication path in the cell 122 of the moving destination is suppressed. As a result, the use efficiency of the resources in the wireless communication system 1 is increased.

Figure 20:
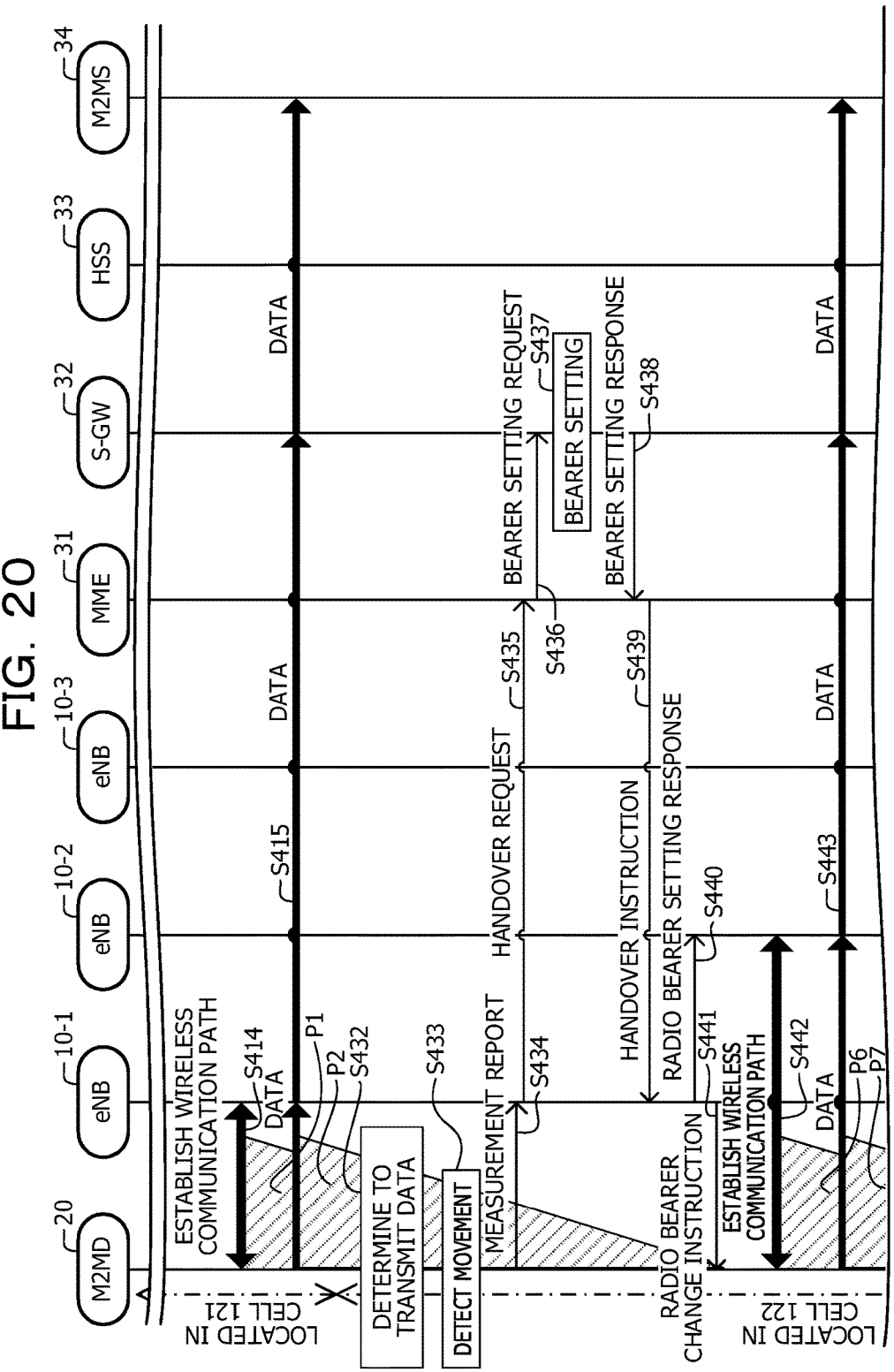

In this regard, at a point in time when the M2MD 20 moved from the cell 121 to the cell 122, if the number of data of at least one group is equal to or larger than the threshold number of data, the wireless communication system 1 performs operation as illustrated in FIG. 20.

For example, at a point in time when the M2MD 20 moved from the cell 121 to the cell 122, the M2MD 20 determines to transmit data (step S432 in FIG. 20). Then the M2MD 20 starts supplying power to the reception circuit so as to start measuring the reception power.

Thereby, the M2MD 20 detects that the M2MD 20 has moved from the cell 121 to the cell 122 (in other words, movement of the M2MD 20 between cells) based on the measured reception power (step S433 in FIG. 20). Then the M2MD 20 transmits a measurement report to the eNB 10-1 in accordance with the detection of the movement between cells (step S434 in FIG. 20).

The eNB 10-1 transmits a handover request to the MME 31 based on the measurement report (step S435 in FIG. 20). A handover request is a signal that requests execution of HO. For example, the handover request includes information for identifying the eNB 10-1 of the HO source and information for identifying the eNB 10-2 of the HO destination.

The MME 31 transmits a bearer setting request to the S-GW 32 in response to the handover request (step S436 in FIG. 20). The S-GW 32 sets a bearer in response to the bearer setting request (step S437 in FIG. 20), and transmits a bearer setting response to the MME 31 (step S438 in FIG. 20).

The MME 31 transmits a handover instruction to the eNB 10-1 in response to the bearer setting response (step S439 in FIG. 20). A handover instruction is a signal that instructs execution of HO. The eNB 10-1 transmits a radio bearer setting request to the eNB 10-2 in response to the handover instruction (step S440 in FIG. 20), and transmits a radio bearer change instruction to the M2MD 20 (step S441 in FIG. 20).

The radio bearer change instruction is a signal that instructs a change of radio bearers. For example, the radio bearer change instruction includes information for identifying the eNB 10-2 that forms a radio bearer of the change destination. Thereby, a wireless communication path is established between the M2MD 20 and the eNB 10-2 (step S442 in FIG. 20). the M2MD 20 transmits data to the M2MS 34 via a communication path including the established wireless communication path (step S443 in FIG. 20).

A hatched area P6 in FIG. 20 indicates a period from a point in time when a wireless communication path is established between the M2MD 20 and the eNB 10-2 to a point in time when a waiting time has passed. In the same manner, a hatched area P7 in FIG. 20 indicates a period from a point in time when the M2MD 20 transmitted data to the eNB 10-2 to a point in time when a waiting time has passed.

In this manner, in this example, if the M2MD 20 moves from the cell 121 to the cell 122 in a period in which a wireless communication path is established between the M2MD 20 and the eNB 10-1, the M2MD 20 performs transmission of the measurement report. Thereby, the processing for establishing a communication path in the cell 122 of the moving destination is performed, and the M2MD 20 transmits data to the M2MS 34 in the cell 122 of the moving destination.

Figure 21:
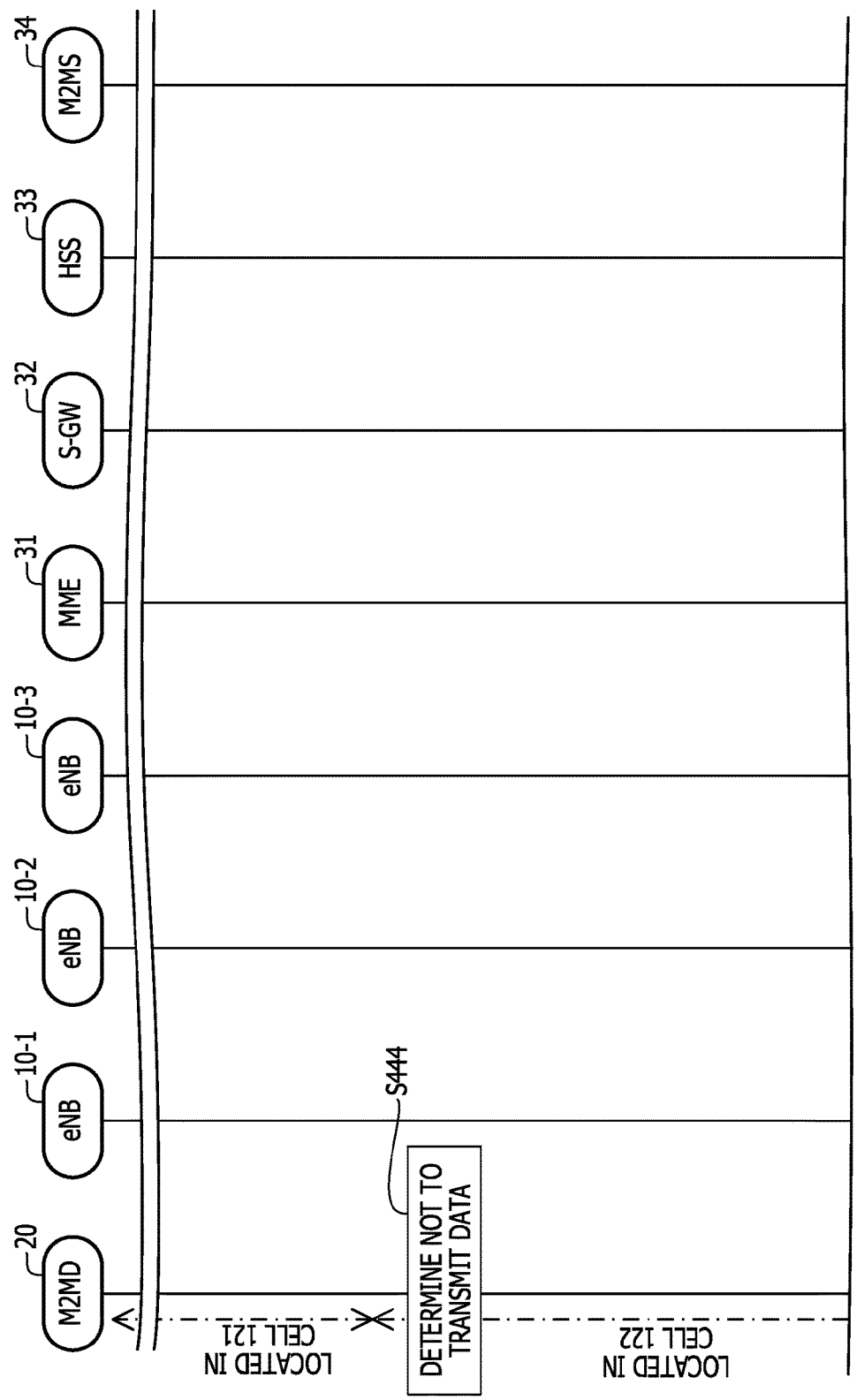

Also, as illustrated in FIG. 21, a description will be given of the case where the M2MD 20 moves from the cell 121 to the cell 122 after the period P2 from a point in time when the M2MD 20 transmitted data to the eNB 10-1 to a point in time when a waiting time has passed.

In this example, it is assumed that at a point in time when the M2MD 20 moved from the cell 121 to the cell 122, there are no groups having the number of data equal to or larger than the threshold number of data, and there are no groups having a timer value equal to or higher than a threshold time. Accordingly, the M2MD 20 determines not to transmit data in a point in time when the M2MD 20 moves from the cell 121 to the cell 122 (step S444 in FIG. 21).

In this example, the M2MD 20 does not transmit an attach request to the eNB 10-2. As a result, the processing for establishing a wireless communication path between the M2MD 20 and the eNB 10-2 is not performed. In this example, the processing for establishing a wireless communication path between the M2MD 20 and the eNB 10-2 may include the processing for updating the location of the M2MD 20, which is registered in HSS 33, via the eNB 10-2

Figure 22:
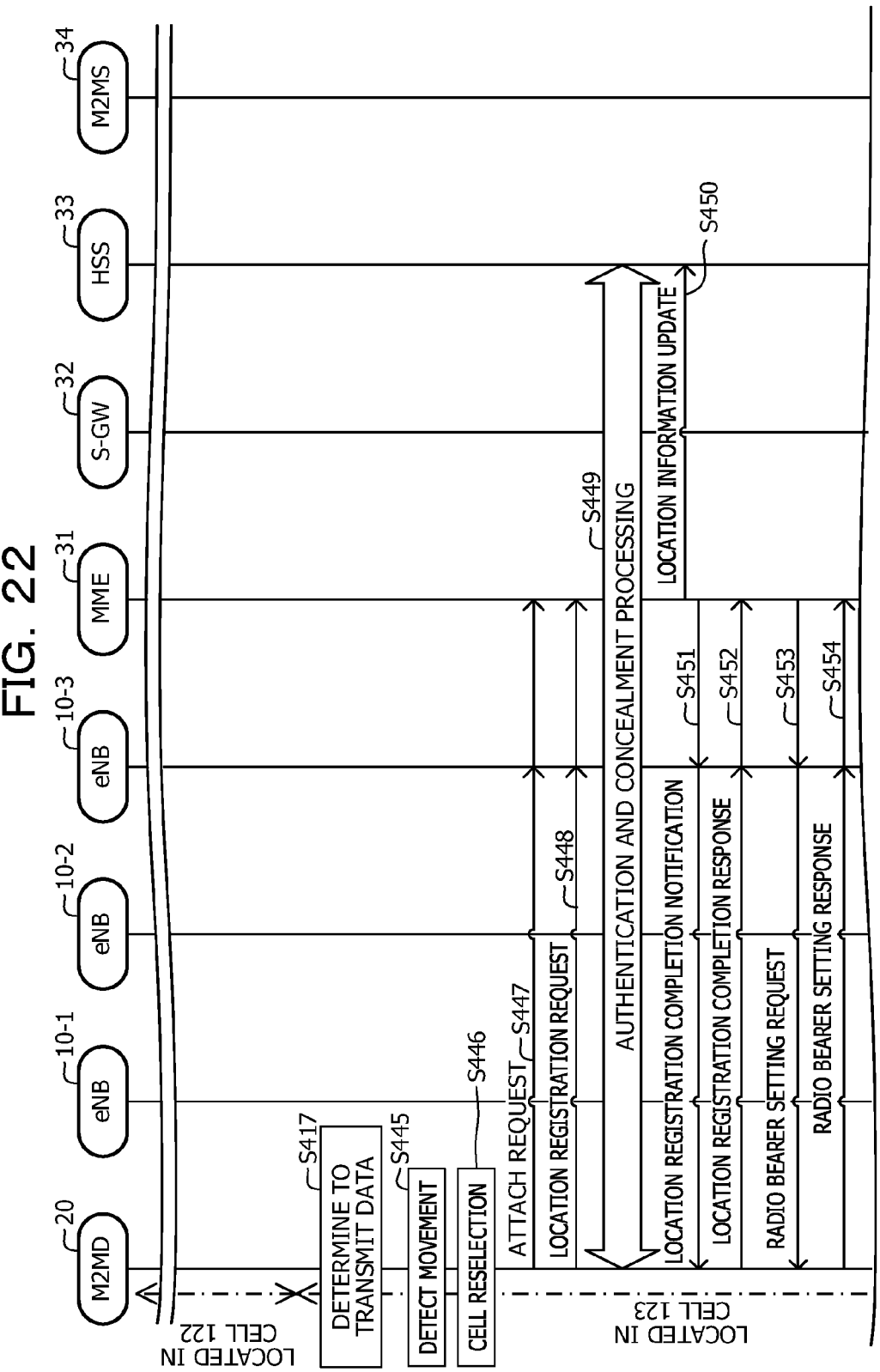

Also, the wireless communication system 1 may perform the steps S445 to S454 in FIG. 22 in place of the steps S418 to S429 in FIG. 18. In this case, the M2MD 20 determines to transmit data (step S417 in FIG. 22), and then detects that the M2MD 20 moved from the cell 122 to the cell 123 based on the measured reception power (step S445 in FIG. 22). Then the M2MD 20 selects the cell 123 of the moving destination as a connection destination cell in response to the detection of movement between cells (step S446 in FIG. 22). The cell selection of the step S446 in FIG. 22 may be represented by cell reselection.

Next, the M2MD 20 transmits an attach request to the eNB 10-3 that forms the selected cell. The eNB 10-3 transmits the attach request from the M2MD 20 to the MME 31 (step S447 in FIG. 22).

Next, the M2MD 20 transmits a location registration request to the eNB 10-3 that forms the selected cell. The eNB 10-3 transmits the location registration request from the M2MD 20 to the MME 31 (step S448 in FIG. 22). A location registration request is a signal that requests registration of the location of the M2MD 20 in the HSS 33. The location registration request includes information indicating the location of the M2MD 20.

Next, the M2MD 20 performs authentication and concealment processing with the HSS 33 (step S449 in FIG. 22). Then the MME 31 transmits a location information update to the HSS 33 (step S450 in FIG. 22). A location information update is a signal that requests the HSS 33 to update the registered location of the M2MD 20. The location information update includes information indicating the location of the M2MD 20. The HSS 33 updates the registered location of the M2MD 20 in response to the location information update.

Next, the MME 31 transmits a location registration completion notification to the eNB 10-3. A location registration completion notification is a signal indicating completion of the registration of the location. The eNB 10-3 transmits the location registration completion notification from the MME 31 to the M2MD 20 (step S451 in FIG. 22).

The M2MD 20 transmits a location registration completion response to the eNB 10-3 in response to the location registration completion notification. A location registration completion response is a signal that indicates reception of the location registration completion notification. The eNB 10-3 transmits the location registration completion response from the M2MD 20 to the MME 31 (step S452 in FIG. 22).

Next, the MME 31 transmits a radio bearer setting request to the eNB 10-3. The eNB 10-3 transmits the radio bearer setting request from the MME 31 to the M2MD 20 (step S453 in FIG. 22).

The M2MD 20 transmits a radio bearer setting response to the eNB 10-3 in response to the radio bearer setting request. The eNB 10-3 transmits the radio bearer setting response from the M2MD 20 to the MME 31 (step S454 in FIG. 22). Thereby, a wireless communication path is established between the M2MD 20 and the eNB 10-3. The M2MD 20 transmits data to the M2MS 34 via a communication path including the established wireless communication path.

Figure 23:
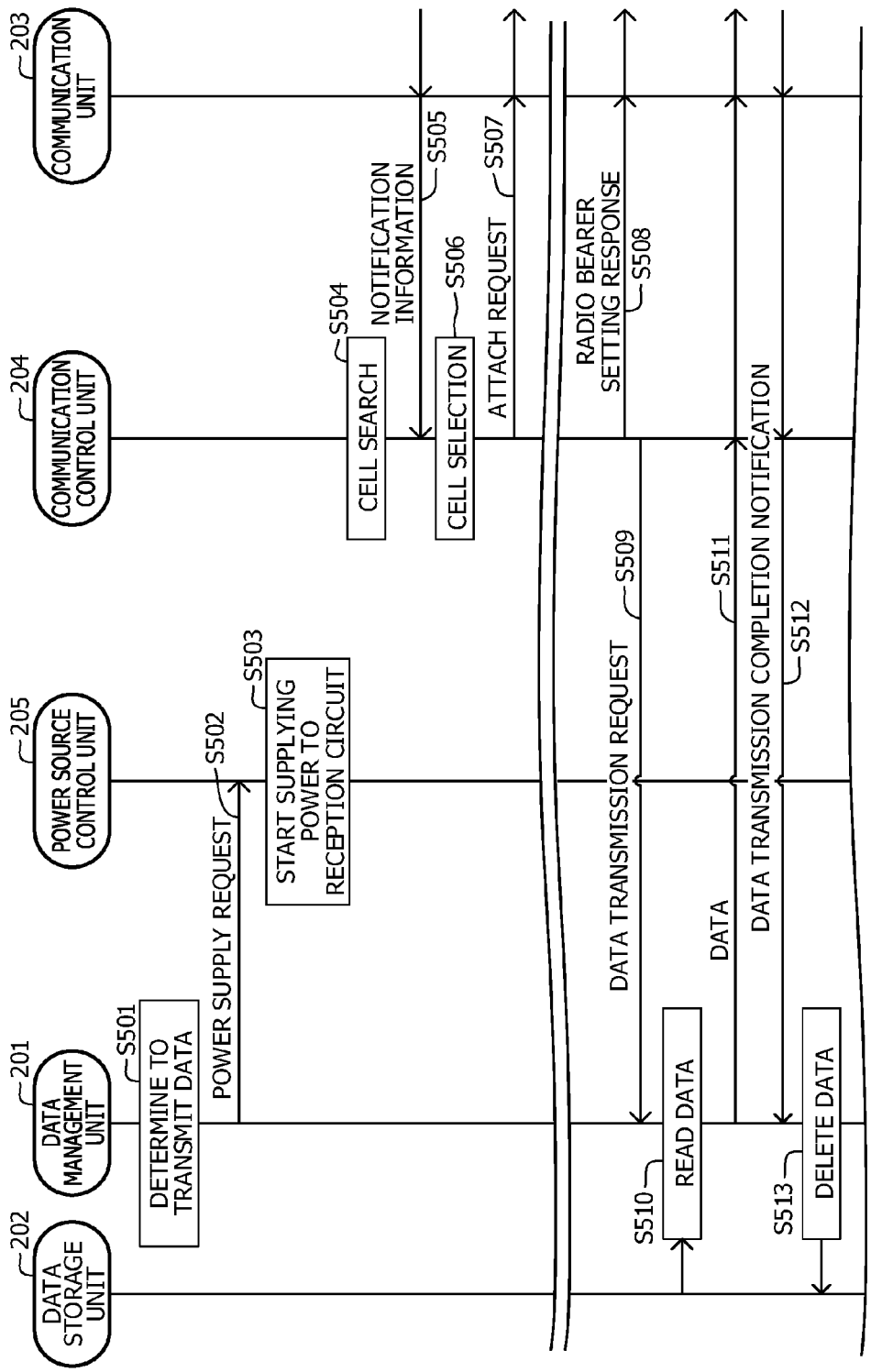
FIG. 23 is a sequence chart illustrating an example of operation of each function unit of the M2MD in FIG. 6.

Next, a description will be given of an example of operation of each function unit of the M2MD 20. FIG. 23 is a sequence chart illustrating an example of operation of each function unit of the M2MD in FIG. 6. It is assumed that the number of data of at least one group is equal to or larger than a threshold number of data in the case where the M2MD 20 is in an idle state. In this case, the data management unit 201 determines to transmit data (step S501 in FIG. 23). Then the data management unit 201 transmits a power supply request to the power source control unit 205 (step S502 in FIG. 23). A power supply request is a signal that requests supplying power to the reception circuit.

The power source control unit 205 starts supplying power to the reception circuit in response to the power supply request from the data management unit 201 (step S503 in FIG. 23). Thereby, the communication control unit 204 performs cell search (step S504 in FIG. 23). Then the communication control unit 204 receives notification information via the communication unit 203 (step S505 in FIG. 23). Next, the communication control unit 204 selects a connection destination cell based on the received notification information (step S506 in FIG. 23).

Then the communication control unit 204 transmits an attach request to the eNB 10-u that forms the selected cell via the communication unit 203 (step S507 in FIG. 23). Next, the communication control unit 204 performs the same operation as the steps S406 to S412 in FIG. 17, and then transmits a radio bearer setting response to the eNB 10-u via the communication unit 203 (step S508 in FIG. 23). In this regard, the communication control unit 204 may perform the same operation as that of the steps S448 to S453 in FIG. 22 in place of the same operation as that of the steps S406 to S412 in FIG. 17.

Then communication control unit 204 transmits a data transmission request to the data management unit 201 (step S509 in FIG. 23). A data transmission request is a signal that requests transmission of data. The data management unit 201 reads the data stored in the data storage unit 202 in response to the data transmission request from the communication control unit 204 (step S510 in FIG. 23). Then the data management unit 201 transmits the read data to the communication control unit 204. The communication control unit 204 transmits the data from the data management unit 201 to the M2MS 34 via the communication unit 203 (step S511 in FIG. 23).

Then the communication control unit 204 receives a data transmission completion notification via the communication unit 203. A data transmission completion notification is a signal indicating completion of transmission of data. The communication control unit 204 transmits a data transmission completion notification to the data management unit 201 in response to the reception of the data transmission completion notification (step S512 in FIG. 23). The data management unit 201 deletes the data stored in the data storage unit 202 in response to the data transmission completion notification from the communication control unit 204 (step S513 in FIG. 23).

In the above, as described, when the M2MD 20 of the first embodiment moves between cells, if the amount of data scheduled to be transmitted is smaller than a predetermined threshold amount of data, the M2MD 20 suppresses the execution of the processing for establishing a communication path in the cell of the moving destination.

Thereby, if the amount of data scheduled to be transmitted is smaller than the threshold amount of data, useless establishment of a communication path in the cell of the moving destination is suppressed. As a result, the use efficiency of the resources (for example, the computer resources and the communication resources, and the like) in the wireless communication system 1 is increased.

For example, transmission of control signals in the wireless communication system 1 for establishing a communication path in the cell of the moving destination is suppressed so that the communication capacity in the wireless communication system 1 is increased. Also, for example, use of the storage area in the wireless communication system 1 for maintaining establishment of a communication path in the cell of the moving destination is suppressed so that the storage capacity of the wireless communication system 1 is increased.

Also, if the amount of data scheduled to be transmitted is smaller than the threshold amount of data, the power consumed by the M2MD 20 for performing processing in order to establish a communication path in the cell of the moving destination is reduced.

Further, in the M2MD 20 of the first embodiment, the processing for establishing a communication path in the cell of the moving destination includes measuring the reception power of the cell of the moving destination. In addition, the suppression of execution of the processing includes suppression of measuring the reception power. Thereby, the power consumed for the M2MD 20 to measure the reception power is reduced.

Further, in the M2MD 20 of the first embodiment, the processing for establishing a communication path in the cell of the moving destination includes updating the registered location of the M2MD 20 in the cell of the moving destination.

Thereby, if the amount of data scheduled to be transmitted is smaller than the threshold amount of data, in the cell of the moving destination, useless update of the location of the M2MD 20 registered in the HSS 33 is suppressed. As a result, the use efficiency of the resources (for example, the computer resources and the communication resources, and the like) in the wireless communication system 1 is increased.

Further, in the M2MD 20 of the first embodiment, the processing for establishing a communication path in the cell of the moving destination proceeds by the M2MD 20 transmitting a predetermined signal (in this example, the measurement report). In addition, the suppression of execution of the processing includes suppression of transmission of the signal. Thereby, the progress of the processing for establishing a communication path is suppressed.

Further, if the amount of data scheduled to be transmitted becomes equal to or larger than the threshold amount of data, the M2MD 20 of the first embodiment performs the processing for establishing a communication path in the cell of the moving destination. Thereby, when the amount of data scheduled to be transmitted becomes equal to or larger than the threshold amount of data, a communication path in the cell of the moving destination is established. As a result, the data scheduled to be transmitted is transmitted using the established communication path.

Further, if the amount of data classified into at least one group out of a plurality of groups is equal to or larger than the threshold amount of data associated with the group, the M2MD 20 of the first embodiment determines that the amount of data scheduled to be transmitted is equal to or larger than the threshold amount of data. Thereby, the degree of delaying transmission of data is suitably adjusted in accordance with the type of the data.

Further, if a time period in which the data scheduled to be transmitted is waiting for transmission becomes equal to or greater than a predetermined threshold time, the M2MD 20 of the first embodiment performs processing for establishing a communication path in the cell of the moving destination. Thereby, an excessive increase in a time period from a point in time when waiting for transmission of the data scheduled to be transmitted is started to a point in time when the data is transmitted is suppressed.

Further, if a time period for waiting transmission of data classified into at least one group out of a plurality of groups is equal to or greater than a threshold time associated with the group, the M2MD 20 of the first embodiment determines that a time period for waiting transmission of the data is equal to or greater than a threshold time. Thereby, the degree of delaying transmission of data is suitably adjusted in accordance with the type of the data.

In this regard, if the M2MD 20 determines not to transmit data, the M2MD 20 may supply power to the reception circuit each time a predetermined selection period passes, measure the reception power of each of a plurality of cells including the moving destination, and select a connection destination cell based on the measured reception power. In this case, a time period from when the M2MD 20 determined to transmit data to when an attach request is transmitted is shortened.

In this case, each function unit of the M2MD 20 performs operation as illustrated in FIG. 24 in place of the operation illustrated in FIG. 23. FIG. 24 is a sequence chart illustrating an example of operation of each function unit of the M2MD in a variation of the first embodiment. For example, the data management unit 201 determines not to transmit data (step S601 in FIG. 24). After that, each time a selection period has passed, the power source control unit 205 starts supplying power to the reception circuit (step S602 in FIG. 24).

The communication control unit 204 performs the same operation as that of the steps S504 to S506 in FIG. 23 so as to select a connection destination cell, and maintains the selected cell (steps S603 to S605 in FIG. 24). After that, the power source control unit 205 terminates supplying power to the reception circuit (step S606 in FIG. 24).

The M2MD 20 repeatedly performs the operation of the steps S602 to S606 each time the selection period has passed. After that, the data management unit 201 determines to transmit data (step S607 in FIG. 24). Thereby, the data management unit 201 transmits a connection request to the communication control unit 204 (step S608 in FIG. 24). A connection request is a signal that requests a connection to the selected cell.

The communication control unit 204 transmits an attach request to the eNB 10-u that forms the maintained connection destination cell in response to the connection request from the data management unit 201 (step S609 in FIG. 24). After that, the M2MD 20 performs the same operation as the subsequent operation to the step S507 in FIG. 23.

In this variation of the M2MD 20, the processing for establishing a communication path in the cell of the moving destination includes measuring the reception power in each of a plurality of cells including the moving destination cell. In addition, if the amount of data scheduled to be transmitted is smaller than the threshold amount of data, the M2MD 20 measures the reception power of each of a plurality of cells, and selects the moving destination cell based on the measured reception power. In addition, if the amount of data scheduled to be transmitted becomes equal to or larger than the threshold amount of data, the M2MD 20 performs processing for establishing a communication path in the selected cell.

Thereby, before a point in time when the amount of data scheduled to be transmitted becomes equal to or larger than the threshold amount of data, the moving destination cell is selected, and thus if the amount of data scheduled to be transmitted becomes equal to or larger than the threshold amount of data, the processing for establishing a communication path in the moving destination cell is promptly performed.

Also, if a predetermined condition is met, the M2MD 20 may be configured not to suppress execution of the processing for establishing a communication path in the moving destination cell. For example, if the condition is met, the M2MD 20 may be configured to maintain the state in which the transmission flag is set to 1 without performing the processing of the step S308 in FIG. 15. The condition is, for example, a condition that the amount of fuel is smaller than a predetermined threshold value, or a condition that the health condition of the passenger of the vehicle is bad (for example, a body temperature is higher than a predetermined threshold value, or a heart rate is higher than a predetermined threshold value). Thereby, if the condition is met, a time period from when the M2MD 20 obtains sensor data to transmission of the sensor data to the M2MS 34 is shortened.

Also, the M2MD 20 may suppress detection of movement between cells by the M2MD 20 in place of suppressing measurement of the reception power. Also, the M2MD 20 may suppress transmission of a measurement report in place of suppressing measurement of the reception power.

Also, the M2MD 20 may use a data size in place of the number of data. Also, the M2MD 20 determines whether or not to transmit data based on both the number of data and the timer value. However, whether or not to transmit data may be determined based on either one of the number of data and the timer value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A wireless device comprising:
a memory; and
a processor coupled to the memory and configured to:
  store data into the memory,
  detect that the wireless device moves from a first cell area formed by a first base station to a second cell area formed by a second base station,
  when it is detected that the wireless device moves from the first cell area to the second cell area, compare an amount of the data stored in the memory with a threshold amount value,
  when the amount of the data stored in the memory is greater than the threshold amount value, determine to execute a processing for establish a communication path between the second base station and the wireless device,
  when it is determined to execute the processing for establish the communication path, execute the processing for establish the communication path,
  send, to the second base station, the data stored in the memory using the established communication path, and
  when the amount of the data stored in the memory is less than the threshold amount value, determine to suppress an execution of the processing for establishing the communication path.

2. The wireless device according to claim 1, wherein
the processing includes measuring a reception power of the wireless device in the second cell area, and
the suppression of the execution includes a suppression of the measuring the reception power.

3. The wireless device according to claim 1, wherein
the processing includes updating location information of the wireless device registered in the second base station.

4. The wireless device according to claim 1, wherein
the processing includes transmitting, from the wireless device, a certain signal, and
the suppression of the execution includes a suppression of the transmitting the certain signal.

5. The wireless device according to claim 4, wherein
the processing includes measuring reception powers of the wireless device in the second cell area and a third cell area, respectively, and
the processor is further configured to:
when the amount of data stored in the memory is less than the threshold amount value, select the second base station based on the measured reception powers, and
after the amount of data stored in the memory becomes greater than the threshold amount value, execute the processing for establishing the communication path between the second base station and the wireless device.

6. The wireless device according to claim 1, wherein
the data includes a plurality of types of data, and the data is classified into a plurality of groups based on the types,
the plurality of groups are associated with a plurality of threshold amount values, respectively, and
the processor is further configured to:
when an amount of data classified into at least one group of the plurality of groups is greater than the threshold amount value associated with the at least one group, determine that the amount of data stored in the memory is greater than the threshold amount value.

7. The wireless device according to claim 1, wherein the processor is further configured to:
when a holding time of the data in the memory is longer than a threshold time value, execute the processing for establishing the communication path between the second base station and the wireless device.

8. The wireless device according to claim 7, wherein
the data includes a plurality of types of data, and the data is classified into a plurality of groups based on the types,
the plurality of groups are associated with a plurality of threshold time value, respectively, and
the processor is further configured to:
when the holding time of data classified into at least one group of the plurality of groups is longer than the threshold time associated with the at least one group, determine that the holding time of the data stored in the memory is longer than the threshold time value.

9. The wireless device according to claim 1, wherein
the wireless device is a machine to machine (M2M) device.

10. A communication method using a wireless device, the communication method comprising:
storing, by the wireless device, data into a memory included in the wireless device;
detecting, by the wireless device, that the wireless device moves from a first cell area formed by a first base station to a second cell area formed by a second base station;
when it is detected that the wireless device moves from the first cell area to the second cell area, comparing an amount of the data stored in the memory with a threshold amount value;
when the amount of data stored in the memory is greater than the threshold amount value, determining, by the wireless device, to execute a processing for establish a communication path between the second base station and the wireless device;
when it is determined to execute the processing for establish the communication path, executing, by the wireless device, the processing for establish the communication path;
sending, by the wireless device, to the second base station, the data stored in the memory using the established communication path; and
when the amount of data stored in the memory is less than the threshold amount value, determining to suppress an execution of the processing for establishing the communication path.

11. The communication method according to claim 10, wherein
the processing includes measuring a reception power of the wireless device in the second cell area, and
the suppression of the execution includes a suppression of the measuring the reception power.

12. The communication method according to claim 10, wherein
the processing includes updating location information of the wireless device registered in the second base station.

13. The communication method according to claim 10, wherein
the processing includes transmitting, from the wireless device, a certain signal, and
the suppression of the execution includes a suppression of the transmitting the certain signal.

14. The communication method according to claim 13, wherein
the processing includes measuring reception powers of the wireless device in the second cell area and a third cell area, respectively, and
the communication method further comprises:
when the amount of data stored in the memory is less than the threshold amount value, selecting the second base station based on the measured reception powers,
wherein, the executing the processing for establishing the communication path is executed after the amount of data stored in the memory becomes greater than the threshold amount value.

15. The communication method according to claim 10, wherein
the data includes a plurality of types of data, and the data is classified into a plurality of groups based on the types,
the plurality of groups are associated with a plurality of threshold amount values, respectively, and
when an amount of data classified into at least one group of the plurality of groups is greater than the threshold amount value associated with the at least one group, the wireless device determines that the amount of data stored in the memory is greater than the threshold amount value.

16. The communication method according to claim 10, further comprising:

when a holding time of the data in the memory is longer than a threshold time value, executing the processing for establishing the communication path between the second base station and the wireless device.

17. The communication method according to claim 16, wherein the data includes a plurality of types of data, and the data is classified into a plurality of groups based on the types, the plurality of groups are associated with a plurality of threshold time value, respectively, and when the holding time of data classified into at least one group of the plurality of groups is longer than the threshold time associated with the at least one group, the wireless device determines that the holding time of the data stored in the memory is longer than the threshold time value.

18. The communication method according to claim 10, wherein the wireless device is a machine to machine (M2M) device.

\* \* \* \* \*